United States Patent Office 3,828,081
Patented Aug. 6, 1974.

3,828,081
STEROIDYL-ESTRATRIENES
Alberto Ercoli, Milan, Rinaldo Gardi, Carate Brianza, and Romano Vitali, Casatenovo, Italy, assignors to Warner-Lambert Company, Morris Plains, N.J.
No Drawing. Continuation-in-part of abandoned application Ser. No. 129,634, Mar. 30, 1971. This application Jan. 31, 1973, Ser. No. 328,208
Int. Cl. C07c 169/60
U.S. Cl. 260—397.2
21 Claims

ABSTRACT OF THE DISCLOSURE

Biologically active disteroidyl ethers consisting of two steroid nuclei joined together by an oxygen bridge are prepared by reacting a 17-hydroxy estratriene with an enol ether or an acetal of a 3-ketosteroid of the androstane, gonane, cholestane or pregnane series and their 19-nor derivatives. The reaction is carried out under anhydrous conditions and in the presence of an acid catalyst, at a temperature higher than 70° C.

CROSS-REFERENCE TO RELATED APPLICATION

This application is a continuation-in-part of our pending U.S. patent application Ser. No. 129,634, filed Mar. 30, 1971 now abandoned.

SUMMARY OF THE INVENTION

It is an object of the present invention to provide new steroid molecules consisting of two hormonal entities different each other in nature and in constitution, which are joined together by an oxygen bridge involving the carbon atoms in the 3- and 17-positions of the reacting steroids.

The new disteroidyl ethers of this invention are derivatives of 17-hydroxy-estratrienes with 3-ketosteroids of the androstane, gonane, cholestane or pregnane series and the 19-nor-derivatives thereof. These compounds can be represented by the following structural formulae I and II:

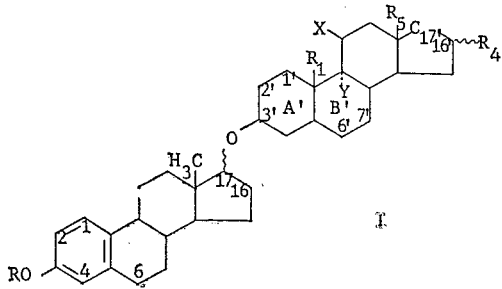

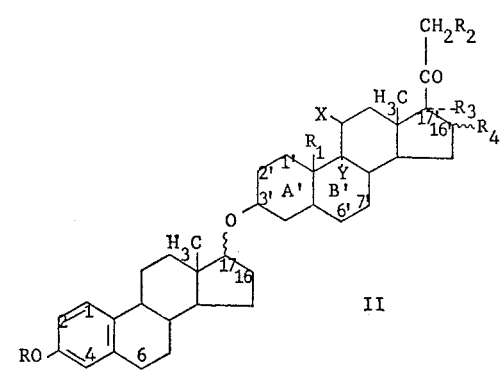

wherein the wavy lines indicate that the oxygen atom linked in 17-position of the estratriene nucleus and the substituent in position 16' of the second steroid nucleus may assume α or β configuration; the positions of the 3-ketosteroid moiety being marked with the symbol (') to distinguish them from the corresponding positions of the estratriene moiety;

R represents hydrogen, an acyl radical derived from a hydrocarbon mono-carboxylic or di-carboxylic acid containing up to 12 carbon atoms, a radical of a polybasic inorganic acid; or a hydrocarbon radical selected from the group consisting of aliphatic, cycloaliphatic and aromatic radicals containing up to 9 carbon atoms;

$R_1$ represents hydrogen or methyl;

$R_2$ and $R_3$ represent each hydrogen, hydroxy or an acyloxy group containing up to 4 carbon atoms;

$R_2$ represents an OAcyl group—in which the Acyl radical is that of a hydrocarbon monocarboxylic or dicarboxylic acid containing up to 12 carbon atoms or is derived from a polybasic inorganic acid—when $R_3$ is hydrogen or hydroxy;

$R_3$ represents an acyloxy group containing up to 7 carbon atoms, inclusive, when $R_2$ is hydrogen or hydroxy;

$R_4$ represents hydrogen, halogen, methyl, methylene or an alkanoyloxy radical containing up to 4 carbon atoms;

$R_2$ and $R_3$ may form together a cyclopentylidenedioxy radical, or $R_3$ and $R_4$ may form together an isopropylidenedioxy radical or a 1″-methylbenzylidenedioxy radical;

Y represents hydrogen, fluoro or chloro;

X represents hydrogen, β-hydroxy, ketonic oxygen, or chloro when also Y represents chloro; the carbon atom at the 17'-position of formula I having one of the following structures:

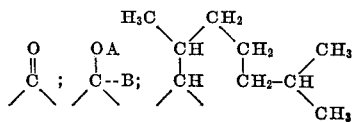

wherein A represents hydrogen, an acyl radical derived from a hydrocarbon mono-carboxylic or di-carboxylic acid containing up to 12 carbon atoms or a radical of a polybasic inorganic acid; and B represents hydrogen or a saturated or unsaturated alkyl radical containing up to 3 carbon atoms, such as methyl, ethyl, propyl, isopropyl, vinyl, ethynyl, propynyl and the like;

$R_5$ represents methyl or ethyl.

In accordance with the structure of the reacting 3-ketosteroid, the rings A' and B' in the Formulae I and II may have one of the following structures:

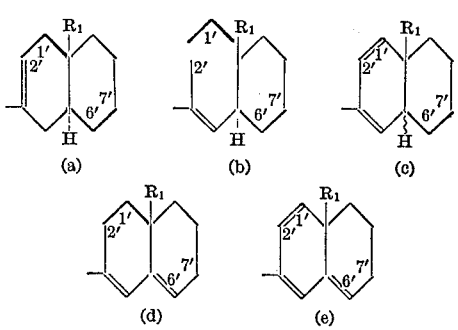

The compounds of the present invention, as defined by the Formulae I and II above, may contain in addition a methyl radical or a halogen atom, particularly fluorine or chlorine, in one or more of the positions 1', 2', 6' and 7'. Further, the 7'-position can also be substituted by a thio-acyl group, and a methylene bridge can be also attached to the carbon atoms at the position 1'–2' of the compounds of Formula II.

Optional substituents, such as hydroxy, methoxy or halogens may be also contained in position 2 or 6 of the estratriene moiety.

The invention sought to be patented also includes certain 17'-spiro lactones of 7'-acyl-thio substituted compounds of Formula I, among which are particularly interesting those compounds wherein the 3-ketosteroid moiety consists of the 17-spiro lactone of 3-keto-7α-acetyl-thio-androst-4-ene and of its 19-nor-analogue.

The invention further describes certain disteroidyl compounds in which the 3-ketosteroid moiety is formed by aldosterone, isoaldosterone and their 21-ester derivatives.

The acyloxy and acyl radicals which are present in the disteroidyl compounds of this invention preferably derive from organic carboxylic acids containing up to 12 carbon atoms. Particularly, these acids may be monocarboxylic or dicarboxylic acids, saturated or unsaturated, including the aromatic acids, and may contain a straight or branched aliphatic chain, or may be formed by a cycloaliphatic, arylaliphatic or aromatic group. They may also be substituted by alkoxy or amino groups, halogen atoms and the like. Typical esters are the acetate, propionate, butyrate, valerate, enanthate, caproate and their isomers, the trimethylacetate, aminoacetate, hemisuccinate, phenoxyacetate, phenylpropionate, phenylbutyrate, cyclopentylacetate, cyclopentylpropionate, cyclohexylacetate, β-chloropropionate, undecanoate, benzoate, p-chloro- or fluoro-benzoate, and the like, the hemioxalate, hemimalonate, hemisuccinate, hemiglutarate, hemiphthalate, hexahydro-hemiphthalate and their salts with organic or inorganic bases. In the case of the acid esters, the metal salts are commonly used, such as the alkali and alkaline earth metals. Esters of polybasic inorganic acids, such as sulfates, phosphates and the like, are also of particular interest since they provide water-soluble esters commonly used in steroid hormone therapy.

The hydrocarbon radical defined by the substituent R may be selected from aliphatic, cycloaliphatic, arylaliphatic and aromatic radicals containing up to 9 carbon atoms.

It may be straight or branched, saturated or unsaturated, and optionally substituted by functional groups. Representative of such radicals are the methyl, ethyl, vinyl, propyl, butyl, amyl, hexyl, heptyl, octyl, nonyl and their isomers, ethoxyethyl, cyclopropyl, cyclopropylmethyl, cyclobutyl, cyclohexyl, cycloheptyl, cyclooctyl, cyclopentenyl, cyclohexenyl, cyclooctenyl, 1-methoxycyclopentyl, 1 - ethoxycyclopentyl, 1 - methoxycyclohexyl, 1-ethoxycyclohexyl, tetrahydropyranyl, benzyl, p-chlorobenzyl and the like.

According to the present invention, the new steroidyl-estratrienes are prepared by reacting, under proper conditions, a 17-hydroxy estratriene with an activated derivative of a 3-ketosteroid of the androstane, pregnane or cholestane series as well as 18-homo and/or a 19-nor-derivative thereof. The term "activated derivative" is used herein to indicate the typical enol- or acetal-derivatives, such as enol ethers, enol esters, hemiacetals or acetals of the 3-keto function, and preferably the alkyl enol ethers or dialkyl acetals of said 3-ketosteroids.

BRIEF DESCRIPTION OF THE PROCESS OF THE INVENTION

The process of this invention is illustrated schematically by the flow chart below wherein: Formula III represents the 17α- or 17β-hydroxy estratriene starting material, whose hydroxy group in 3-position is preferably protected under the form of an ether or an ester; Formulae IV and V represent the 3-ketosteroids of the androstane, cholestane and pregnane series and their 18-homo and 19-nor analogs which are used in the process of this invention under the form of the corresponding activated derivatives (enol ethers or acetals), as defined above; Formulae VI and VII derivatives (enol ethers or acetals), as defined above; Formulae VI and VII represent the disteroidyl compounds resulting from the above reaction.

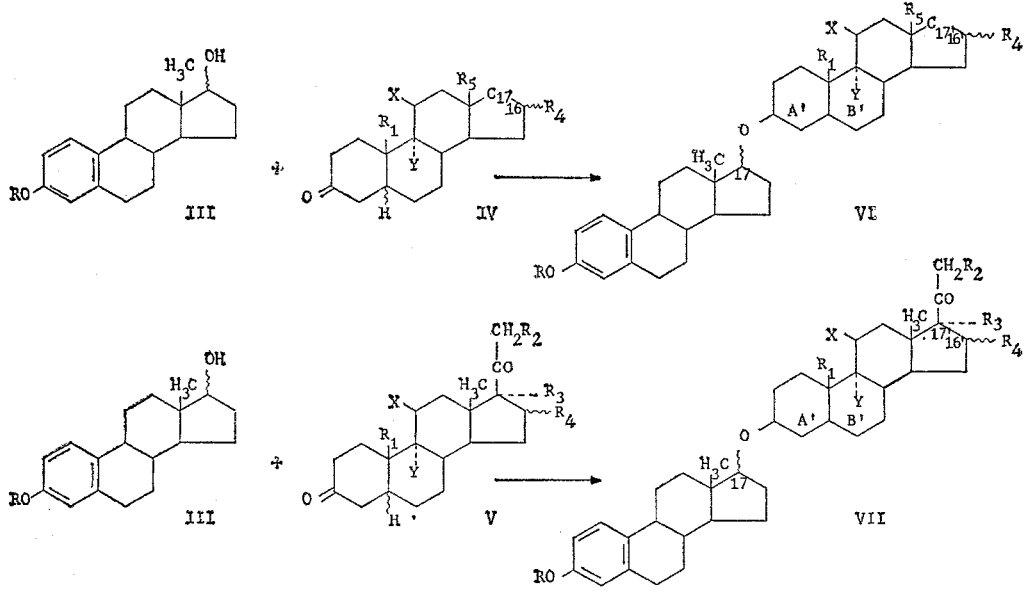

DETAILED DESCRIPTION OF THE INVENTION

The process of this invention is usually carried out under anhydrous conditions, in a suitable solvent such as benzene, toluene, dimethylformamide or isooctane, and in the presence of a suitable acid catalyst, such as p. toluene-sulfonic acid, naphthalene-sulfonic acid, pyridine p. toluene-sulfonate, pyridine chlorhydrate, and the like. The reaction is preferably accomplished at a temperature higher than 70° C. for a period from about 30 minutes to about 4 hours.

Referring now to the Formulae VI and VII of the drawing it will be noted that they contain all the substituents shown by the Formulae I and II. In particular the rings A' and B' of the resulting disteroidyl compound have one of the possible structures (a)–(e), as defined above, and the $C_{17'}$ carbon atom and the substituents R, $R_1$, $R_2$, $R_3$, $R_4$, $R_5$, X, Y have the above stated meanings with the exception that:

(1) R is never an alkoxyalkyl group,
(2) $R_2$ is never a free hydroxy group and in the carbon atom C'17, A is never either hydrogen or an alkoxyalkyl group. In order to obtain compounds in which $R_2$ is a free hydroxy group and in the carbon atoms $C'_{17'}$ A is a hydrogen atom, the compounds of formula VI and VII can be submitted to alkaline hydrolysis.

The compounds in which R and/or A are represented by an alkoxyalkyl group are obtained by submitting the corresponding 3- and/or 17-hydroxy compounds to etherification.

The present invention includes all those compounds which can be obtained through obvious reactions, such as saponification, reduction, oxydation, condensation and acylation carried out upon keto and/or hydroxy groups which are present in the disteroidyl derivative thus obtained.

The structure of the disteroidyl derivative obtained through the etherification of a 17α- or 17β-estradiol (III) with a substituted or unsubstituted alkyl enol ether or dialkyl acetal of a keto-steroid (IV or V) strictly depends from the nature of the 3-keto-steroid itself. The following scheme is given:

| Parent 3-keto compound | Enolether or acetal starting materials | Structure of the rings A' and B' in the disteroidyl compound |
|---|---|---|
| 3-keto-5α steroid | 3-keto-5α-steroid enol-ether ot acetal. | (a) $\Delta^{2}$-ene, 5α. |
| 3-keto-5β steroid | 3-keto-5β-steroid enol-ether or acetal. | (b) $\Delta^{3}$-ene, 5β. |
| $\Delta^{1}$-3-keto 5α-steroid | $\Delta^{1}$-3-keto-5α-steroid enolether or 1α-alkoxy-3-keto-5α-steroid acetal. | (c) $\Delta^{1,3}$-diene, 5α. |
| $\Delta^{1}$-3-keto-5β-steroid | $\Delta^{1}$-3-keto-5β-steroid enolether or 1α-alkoxy-3-keto 5β-steroid acetal. | (c¹) $\Delta^{1,3}$-diene, 5β. |
| $\Delta^{4}$-3-keto steroid | $\Delta^{4}$-3-keto-steroid enolether. | (d) $\Delta^{3,5}$-diene. |
| $\Delta^{1,4}$-3-ketosteroid or 1α-alkoxy $\Delta^{4}$-3-keto steroid. | $\Delta^{1,4}$-3-ketosteroid or 1α-alkoxy-$\Delta^{4}$-3-ketosteroid enolether. | (e) $\Delta^{1,3,5}$-triene. |

The preferred alkyl- or substituted alkyl enol ethers, starting materials, are those containing from 1 to 7 carbon atoms, such as methyl-, ethyl-, β-halogen substituted ethyl-, propyl-, butyl-enol ether and their isomers. Furthermore the cycloalkyl-enol ethers containing 5 or 6 carbon atoms or an allyl-enol ether are also used. As acetal, the dimethyl- or diethyl-acetal is preferably used.

PREPARATION OF THE STARTING MATERIALS (a) and (b). The acetals of saturated 3-ketones (5α or 5β) can be easily prepared by simultaneous action of an alkyl orthoformiate and of the corresponding alcohol over the 3-ketone according to Serini and Köster's method (Ber. *71*, 1766; 1938). The enol ethers of saturated 3-keto-steroids (5α or 5β) may also be obtained by reacting the 3-keto-steroid with methanol in the presence of an acid catalyst, according to the method of M. Janot et al. (Bull. Franc. 2109, 1961) or to the method of J. Slomp et al. (J.A.C.S. *77*, 1216; 1955).

By submitting a dialkyl acetal of the saturated 3-ketone to pyrolysis under conditions analogous to those disclosed by H. H. Inhoffen and Coll. (Ann. *568*, 52, 1950), the corresponding enol ether is obtained. It will have the structure: (a) $\Delta^{2}$-ene, 5α if the 3-keto-steroid belongs to the series 5α, or the structure; (b) $\Delta^{3}$-ene, 5β if the 3-keto belongs to the series 5β.

The enol ethers of the 3-keto-5α-steroids can be obtained, according to the method described in U.S. Pat. No. 3,118,917, by catalytic hydrogenation of the double bond in position 5 from the corresponding enol ethers of analogous $\Delta^{4}$-3-ketones (that is ethers of 3-oxy-$\Delta^{3,5}$-diene steroids), followed by spontaneous migration of the remaining double bond from the 3:4 position to the 2:3 position.

The enol ethers of 3-keto 5α-steroids having a $\Delta^{3}$-ene structure may be obtained, according to the method described in our U.S. Pat. No. 3,264,329, by catalytic hydrogenation of the corresponding enolethers of $\Delta^{4}$-3-ketosteroids in the presence of a catalytic amount of a basic substance.

(c) and (c'). The enol ethers of $\Delta^{1}$-3-keto-5α-steroids having the $\Delta^{1,3}$-diene, 5α structure can be obtained by submitting to pyrolysis the triethers of 1α,3,3-trihydroxy-5α-steroids, as described in British Pat. No. 1,203,278 and as disclosed and claimed in the U.S. patent application Ser. No. 202,572, filed Nov. 26, 1971, now Pat. No. 3,780,072.

The pyrolysis reaction is preferably carried out at a temperature of from 60° C. to 155° C., in the presence of a suitable acid catalyst.

The triethers of 1α,3,3-trioxysteroids—starting materials for the above-mentioned application—are disclosed and claimed in the U.S. Pat. No. 3,475,467. They may be obtained by treating the $\Delta^{1}$-3-keto-5α-steroids with an alcohol and an orthoformiate under anhydrous conditions at a temperature lower than 60° C. in the presence of an acid catalyst.

According to the process of the present invention, both 1α,3,3-trialkoxysteroids and the corresponding $\Delta^{1}$-3-keto enol ethers may be used for the condensation with 17-hydroxy-estratriene; but the formers, being the precursors of the enol ethers, have the advantage of a more immediate preparation and therefore they may be preferred starting materials for the preparation of the disteroidyl derivatives having a $\Delta^{1,3}$-diene structure.

(d) The enol ethers of $\Delta^{4}$-3-ketones may be easily prepared by submitting the $\Delta^{4}$-3-keto-steroid to enol etherification with an alkyl orthoformiate or an alcohol, according to the well known procedures of the art.

When as reagent material in the method of the present invention there is used an enol ether of a $\Delta^{4}$-3-ketone containing an alkyl radical higher than methyl or ethyl, the method disclosed in the U.S. Pat. No. 3,019,241 may be applied. Such method consists in submitting the methyl- or ethyl-enol ether to trans(enol)-etherification by means of treatment with a high alcohol.

(e) The 3-enolethers of 3-keto-$\Delta^{1,4}$-steroids may be obtained by enol-etherification of the 3-keto-$\Delta^{1,5}$-pregnadiene with ethyl orthoformiate and an alcohol in the presence of a strong acid catalyst as described in U.S. Pat. No. 3,068,253. In place of the 3-enolethers of 3-keto-$\Delta^{1,4}$-steroids there may be used, for the preparation of the disteroidyl compounds having a $\Delta^{1,3,5}$-triene structure, the corresponding alkyl enol ethers of 1α-alkoxy-$\Delta^{4}$-3-ketones (or 1α,3-dialkoxy-$\Delta^{3,5}$-dienes). These compounds are obtained by submitting the $\Delta^{1,4}$-3-ketosteroids to the simultaneous action of an alkyl orthoformiate and of the corresponding alcohol under anhydrous conditions at a temperature lower than 60° C., in the presence of a suitable acid catalyst.

The method for preparing 1α,3-dialkoxy-$\Delta^{3,5}$-diene steroids of the pregnane series is disclosed in our U.S. Pat. No. 3,506,650. This method may be applied to the preparation of corresponding 1α,3-dialkoxy-$\Delta^{3,5}$-diene steroids of the androstane series and of their 19-nor or 18-homo derivatives.

HORMONAL ACTIVITY OF STEROIDYL-ESTRATRIENES

The compounds of the invention proved to pocess interesting pharmacological properties which differ from those produced by the two constituting steroid entities when separately administered. In general, the compounds of the invention are potent, long-acting estrogenic agents, suitable for oral and parenteral administration and this is particularly evidenced in those disteroidyl compounds in which the hydroxy group in the 17-position has the 17β-structure.

In particular, when the 17-hydroxy-estratriene is the 17β-estradiol and its 3-esters or 3-ethers as above defined and the other etherifying entity is an enol ether of the androstane, 19-norandrostane and progestinic series, disteroidyl compounds are obtained having a high and prolonged oestrogenic, contraceptive and anti-androgen activities.

When the 17-hydroxy-estratriene is still the 17β-estradiol and the other etherifying entity belongs to the cortical series, the resulting disteroidyl ethers show both estrogenic and corticoid properties and displays a significant anti-inflammatory activity. The estratriene moiety has a potentiating or synergistic effect on the anti-inflammatory activity of corticoids while the activity on thymus, spleen and adrenals are generally reduced in the disteroidyl (estrocorticoid) compounds.

When, on the contrary, the 17-hydroxy-estratriene is the 17α-estradiol and a 3-ester or 3-ether thereof or a 17β-estradiol optionally substituted at positions 2 or 6 or 16, and the other etherifying entity is as above described, disteroidyl ethers having attenuate estrogenic properties are obtained. In these compounds, however, the other hormonal property—produced by the 3-keto moiety—is generally potentiated and the resulting disteroidyl compounds show high progestinic, contraceptive or anti-inflammatory activity.

In accordance with the invention, pharmaceutical compositions having the above described activities may be prepared by incorporating one of the active ingredients represented by Formula I or II in an inert solid or liquid pharmaceutically acceptable carrier.

Such compositions in general contain the active ingredient in an amount of from about 10μ to about 15 mg., and preferably from about 25μ to 5 mg. and may be in form of tablets, powders, capsules, ampules or multiple dose flacons and other pharmaceutical forms suitable for the oral or the parenteral administration.

Hereinafter are given the pharmacological data obtained by testing some representative compounds of the invention.

DETERMINATION OF THE PROLONGED UTEROTROPHIC ACTIVITY

The compounds under testing in 0.2 ml. sesame oil solution were administered in a single dose of 0.1 μmoles to spayed rats weighing about 44–48 g. Groups of rats were sacrificed, according to the administration route, at the end of the first, second and fourth week from the treatment, respectively and the uterus weight of the treated animals and controls was determined on torsion balance. The increase of the uterus weight was considered as an index of the estrogenic activity.

The results obtained are summarized, according to the administration route, in Tables I and II: as standard compounds estradiol 3 - benzoate and 3-cyclopentyloxy-19-nor - 17α-pregna-1,3,5(10)-trien-20-yn-17-ol were chosen to be compared with the data obtained by oral administration and ethynyl estradiol and estradiol 3-benzoate for the data obtained by subcutaneous administration.

TABLE I

| Compound administered orally | Uterus weight (mg.) after— | |
|---|---|---|
| | 1 week | 2 weeks |
| Control | 16.1±0.40 | 15.9±0.48 |
| Estradiol 3-benzoate | 20.7±0.73 | 18.5±0.43 |
| 3-cyclopentyloxy-19-nor-17α-pregna-1,3,5(10)-trien-20-yn-17-ol | 40.3±0.80 | 30.45±1.71 |
| 17β-(17'-oxo-androsta-3',5'-dien-3'-yloxy)-estra-1,3,5(10)-trien-3-ol benzoate | 61.8±2.86 | 36.1±1.33 |
| 17β-(17'β-acetoxyestra-3',5'-dien-3'-yloxy)-estra-1,3,5(10)-trien-3-ol benzoate | 48.0±3.18 | 31.6±1.09 |
| 17β-(17'β-propionoxy-androsta-3',5'-dien-3'-yloxy)-estra-1,3,5(10)-trien-3-ol benzoate | 49.4±2.37 | 31.0±0.91 |
| 17β-(17'-oxo-19'-nor-androsta-3',5'-dien-3'-yloxy)-estra-1,3,5(10)-trien-3-ol benzoate | 59.8±3.49 | 43.7±2.58 |
| 17β-(17'-oxo-androsta-3',5'-dien-3'-yloxy)-estra-1,3,5(10)-trien-3-ol | 56.9±2.13 | 38.9±1.89 |
| 17β-(17'β-hydroxy-estra-3',5'-dien-3'-yloxy)-estra-1,3,5(10)-trien-3-ol | 59.9±2.48 | 41.6±1.74 |
| 17β-(17'β-hydroxy-androsta-3',5'-dien-3'-yloxy)-estra-1,3,5(10)-trien-3-ol | 52.0±2.10 | 36.8±1.15 |
| 17β-(17'-oxo-estra-3',5'-dien-3'-yloxy)-estra-1,3,5(10)-trien-3-ol | 71.7±5.33 | 43.6±2.41 |
| 17β-(17'-oxo-estra-3',5'-dien-3'-yloxy)-estra-1,3,5(10)-trien-3-ol hemisuccinate [1] | 59.2±3.69 | |

[1] Aqueous suspension additioned of $Na_2HPO_4$.

TABLE II

| Compound administered subcutaneously | Uterut weight (mg.) after 4 weeks |
|---|---|
| Control | 15.0±0.88 |
| Ethynyl-estradiol | 25.1±0.99 |
| Estradiol 3-benzoate | 40.1±4.03 |
| 17β-(20'-oxo-21'-acetoxy-pregna-3',5'-dien-3'-yloxy)-estra-1,3,5(10)-trien-3-ol benzoate | 150.7±14.10 |
| 17β-(17'β-acetoxy-17'-α-methyl-androsta-3',5'-dien-3'-yloxy)-estra-1,3,5(10)-trien-3-ol benzoate | 171.9±12.30 |
| 17β-(11',20'-dioxo-17'α-hydroxy-21'-acetoxy-pregna-1',3',5'-trien-3'-yloxy)-estra-1,3,5(10)-trien-3-ol benzoate | 173.1±15.70 |
| 17β-(17'α-acetoxy-20'-oxo-6'-methyl-pregna-3',5'-dien-3'-yloxy)-estra-1,3,5(10)-trien-3-ol-benzoate | 116.1±13.30 |
| 17β-(17'β-acetoxy-19'-nor-17'-α-pregna-3',5'-dien-20'-yn-3'-yloxy)-estra-1,3,5(10)-trien-3-ol benzoate | 177.6±7.74 |
| 17β-(9'α-fluoro 11'β,17'α-dihydroxy 20'-oxo-21'-acetoxy-16'β methyl pregna-3',5'-dien-3'-yloxy)-estra-1,3,5(10)-trien-3-ol benzoate | 136.6±14.80 |
| 17β-(cholesta-3',5'-dien-3'-yloxy)-estra-1,3,5(10)-trien-3-ol benzoate | 188.0±11.00 |
| 17β-(17'β-hydroxy-17'α-methyl-androsta-3',5'-dien 3'-yloxy) estra-1,3,5(10) trien 3 ol | 168.7±7.35 |
| 17β-(17'β-propionoxy-5'-β-androst 3'-en-3'-yloxy)-estra-1,3,5(10) trien-3-ol benzoate | 213.4±10.90 |
| 17β-(17'β-propionoxy androsta-3'-5'-dien-3'-yloxy)-estra-1,3,5(10)trien-3-ol benzoate | 188.7±5.80 |
| 17β-(17'β-acetoxy-5'α androst-2'-en-3'-yloxy)-estra-1,3,5-(10)-trien-3-ol benzoate | 168.1±14.60 |
| 17β-(20'-oxo pregna-3',5'-dien-3'-yloxy)-estra-1,3,5(10)-trien-3-ol benzoate | 180.1±11.50 |
| 17β-(9'α-fluoro-11',20'-dioxo-17'α-hydroxy-21'-acetoxy-16'β-methyl pregna-3',5'-dien-3'-yloxy)-estra-1,3,5(10)-trien-3-ol benzoate | 143.0±17.20 |

Tables I and II show that the compounds according to the invention exhibit a greater estrogen activity than the standard compounds.

DETERMINATION OF THE CONTRACEPTIVE ACTIVITY

The contraceptive activity was determined in mature Wistar female rats weighing about 180–205 g. The compounds under testing, in 0.2 ml. sesame oil solution, were injected subcutaneously in a single dose of 0.5 μmole and the following day the treated animals were caged with fertile males. Monthly autopsies of 10 animals per group gave the data summarized in Table III where it is indicated the situation up to the 90th day from the treatment. As standard compound 3-(cyclopentyloxy)-19-nor-17α-pregna-1,3,5(10)-trien-20-yn-17-ol was taken.

Table III shows that the contraceptive activity of the two compounds of the invention is much higher than that displayed by the standard 3-(cyclopentyloxy)-19-nor-17α-pregna-1,3,5(10)-trien-20-yn-17-ol: particularly after two months while 9 out of 10 animals treated with the standard were pregnant, none of the remaining two groups was pregnant and after three months while all the animals treated with the standard had already delivered, only one treated with 17β-(17'β-acetoxy-19'-nor-17'α-pregna-3',5'-dien - 20'-yn-3'-yloxy)-estra-1,3,5(10)-trien-3-ol acetate was pregnant and no pregnancy in the other group occurred. 17β - (17'β - enanthoxy-19'-nor-17'α-pregna-3',5'-dien - 20'-yn-3'-yloxy)-estra-1,3,5(10)-trien-3-ol-benzoate further assayed on female dogs at a single dose of 2 mgs./kg. s.c. displayed an antifertility effect lasting about 15 months. After this period a normal reproductive performance was observed.

DETERMINATION OF THE ANTIGONADOTROPHIC ACTIVITY

The compounds under testing, in 0.2 sesame oil solution, were administered in a single dose to spayed rats weighing about 105–125 g., the day after surgery (parabiosis). Autopsy performed a few days after gave the data summarized in Tables IV, V and VI which were compared to those obtained by administration of 3-(cyclopentyloxy)19-nor-17α-pregna-1,3,5(10)-trien-20-yn-17-ol.

Tables IV, V and VI clearly evidentiate the higher activity of our compounds in respect to the standard 3-cyclopentyloxy-19-nor-17α-pregna-1,3,5(10)-trien-20-yn-17-ol.

DETERMINATION OF THE PROGESTINIC ACTIVITY

The tests were performed according to the Clauberg method on immature female rabbits weighing about 700–900 g. After a 6-day priming with estardiol (5 μg/0.2 ml. oil/die/subcutaneously) the compounds under examination were daily administered for 5 days by oral route. Autopsy was performed the day after the end of the treatment and the data evaluated according to McPhail (J. Physiol. 83, 145, 1934).

3 - Hydroxy - 17β-(17'β-acetoxy-19'-nor-17'α-pregna-3',5' - dien - 20'-yn-3'-yloxy)-estra-1,3,5(10)-trien-6-one-benzoate and 17α - (17'β-hydroxy-19'-nor-17'α-pregna-3', 5'diene-20'-yn-3'-yloxy)-estra-1,3,5(10)-trien-3 - ol tested at equimolar doses in comparison with the parent compound norethindrone acetate were shown to be as progestinic agents twice as active as the standard.

DETERMINATION OF THE CORTICOID ACTIVITY

The compounds under examination were generally evaluated for their anti-inflammatory activity according to the granuloma pouch assay (Nezamis—Acta Endocr. 25, 105) on albino rats. The dorsal skin of the animals was shaved with an electric clipper and before air then croton oil were injected in the middle of the back. The compounds were administered directly into pouch, subcutaneously or orally. The volume of the exudate collected after autopsy was considered as an index of the anti-inflammatory activity.

The compounds under examination tested taking as standard compound the mixture of the two steroids constituting the disteroidyl-ether, showed an enhancement of the anti-inflammatory activity in respect to that displayed by the parent steroid.

TABLE III

| Compound | Treated rats (day 0) | Autopsy on the— | | | | | | | | |
|---|---|---|---|---|---|---|---|---|---|---|
| | | 30th day | | | 60th day | | | 90th day | | |
| | | D[1] | P[2] | NP[3] | D[1] | P[2] | NP[3] | D[1] | P[2] | NP |
| 3-cyclopentyloxy-19-nor-17α-pregna-1,3,5(10)-trien-20-yn-17-ol | 10 | 10 | | | 9 | 1 | | 10 | | |
| 17β-(17'β-acetoxy-19'-nor-17'α-pregna-3',5'-dien-20'-yn-3'-yloxy)-estra-1,3,5(10)-trien-3-ol acetate | 10 | 10 | | | | | | 10 | 1 | 9 |
| 17β-(17'β-enanthoxy-19'-nor-17'α-pregna-3',5'-dien-20'-yn-3'-yloxy)-estra-1,3,5(10)-trien-3-ol-benzoate | 10 | 10 | | | 10 | | | 10 | | 10 |

[1] Delivered; [2] Pregnant; [3] Not pregnant.

TABLE IV

| Compound administered orally | Single dose, μmole | Autopsy performed on 10th day from surgery | |
|---|---|---|---|
| | | Uterus, mg. | Ovaries, mg. |
| Control | | 101.9±12.4 | 145.3±20.6 |
| 3-cyclopentyloxy-19-nor-17α-pregna-1,3,5(10)-trien-20-yn-17-ol | 0.5 | 160.1±11.3 | 100.2±17.9 |
| 17β-(17'β-hydroxy-17'α-methyl-androsta-3',5'-dien-3'-yloxy)-estra-1,3,5(10)-trien-3-ol | 0.5 | 90.3±11.4 | 43.7±7.1 |
| 17β-(9'α-fluoro-11'β,17'α-dihydroxy-20'-oxo-21'-acetoxy-16'β-methylpregna-3',5'-dien-3'-yloxy)-estra-1,3,5(10)-trien-3-ol benzoate | 0.5 | 97.9±12.4 | 76.1±14.1 |
| 17β-(17'-oxo-19'-nor-androsta-3',5'-dien-3'-yloxy)-estra-1,3,5(10)-trien-3-ol benzoate | 0.5 | 83.4±15.7 | 30.1±2.8 |

TABLE V

| Compound | Single dose, μmole | Autopsy performed on 11th day from surgery | |
|---|---|---|---|
| | | Uterus, mg. | Ovaries, mg. |
| Control | | 139.4±8.8 | 137.8±14.7 |
| 3-cyclopentyloxy-19-nor-17α-pregna-1,3,5(10)-trien-20-yn-17-ol | 0.5 | 156.5±8.5 | 129.3±19.1 |
| 17β-(17'-oxo-androsta-3',5'-dien-3'-yloxy)-estra-1,3,5(10)-trien-3-ol | 0.2 | 128.3±11.7 | 69.0±13.7 |
| 17β-(17'β-hydroxy-estra-3',5'-dien-3'-yloxy)-estra-1,3,5(10)-trien-3-ol | 0.2 | 87.7±13.0 | 36.4[±2.7 |
| 17β-(17'β-hydroxy-androsta-3',5'-dien-3'-yloxy)-estra-1,3,5(10)-trien-3-ol | 0.2 | 117.2±9.6 | 100.8±15.7 |
| 17β-(17'-oxo-estra-3',5'-dien-3'yloxy)-estra-1,3,5(10)-trien-3-ol | 0.2 | 119.6±15.7 | 60.5±10.6 |
| 17β-(17'β-hydroxy-19'-nor-17'α'-pregna-3',5'-dien-20'-yn-3'-yloxy)-estra-1,3,5(10)-trien-3-ol | 0.2 | 98.4± 9.3 | 73.2±10.7 |
| 17β-(17'-oxo-19'-nor-androsta-3',5'-dien-3'-yloxy)-estra-1,3,5(10)-trien-3-ol benzoate | 0.2 | 108.5±14.3 | 43.2± 6.3 |
| 17β-(17'β-acetoxy-19'-nor-17'α-pregna-3',5'-dien-20'-yn-3'yloxy)-estra-1,3,5(10)-trien-3-ol acetate | 0.2 | 118.5±11.1 | 81.2±13.9 |
| 17β-(17'-oxo-androsta-3',5'-dien-3'-yloxy)-estra-1,3,5(10)-trien-3-ol benzoate | 0.2 | 127.1± 7.2 | 82.8±9.2 |
| 17β-(17'β-acetoxy-estra-3',5'-dien-3'-yloxy)-estra-1,3,5(10)-trien-3-ol benzoate | 0.2 | 140.4±17.0 | 68.0±16.2 |

TABLE VI

| Compound administered subcutaneously | Single dose, μmole | Autopsy performed on 10th day from surgery | |
|---|---|---|---|
| | | Uterus, mg. | Ovaries, mg. |
| Control | | 164.2±17.0 | 182.6±17.49 |
| 3-cyclopentyloxy-19-nor-17α-pregna-1,3-5(10)-trien-20-yn-17-ol | 0.1 | 101.3±20.14 | 54.7±14.79 |
| 17β-(17'β-acetoxy-19'-nor-17'α-pregna-3',5'-dien-20'-yn-3'-yloxy)-estra-1,3,5(10)-trien-3-ol benzoate | 0.1 | 37.4±5.02 | 32.2±1.64 |
| 17β-(17'β-acetoxy-19'-nor-17'α-pregna-3',5'-dien-20'-yn-3'-yloxy)-estra-1,3,5(10)-trien-3-ol acetate | 0.1 | 61.3±11.31 | 32.2±2.97 |
| 17β-(17'β-enanthoxy-19'-nor-17'α-pregna-3',5'-dien-20'-yn-3'-yloxy)-estra-1,3,5(10)-trien-3-ol benzoate | 0.1 | 57.8±12.16 | 36.9±3.97 |
| 17β-(17'β-enanthoxy-19'-nor-17'α-pregna-3',5'-dien-20'-yn-3'-yloxy)-estra-1,3,5(10)-trien-3-ol benzoate | 0.1 | 44.1±3.22 | 31.3±0.67 |
| 17β-(17'β-acetoxy-19'-nor-17'α-pregna-3',5'-dien-20'-yn-3'-yloxy)-estra-1,3,5(10)-trien-3-ol-butyrate | 0.1 | 44.1±3.22 | 31.3±0.67 |

Particularly 17β - (9'α - fluoro-11'β,17'α-dihydroxy-20'-oxo - 21'-acetoxy-16'β-methylpregna-3',5'-dien-3'-yloxy)-estra-1,3,5(10)-trien-3-ol benzoate, administered into the pouch according to the above method, displayed an anti-inflammatory activity from 5 to 25 times higher than the displayed by the mixture of estradiol 3-benzoate and 1,2-dehydro-betamethasone 21-acetate.

In order to facilitate the description of the preparation of the compounds of this invention, the reacting starting steroids of all examples have been listed in two separated Tables A and B marked by a progressive number following the letter A or B. In Table A are listed the 17-hydroxy-estratrienes starting materials and in Table B are listed the enol ethers or acetals of the reacting 3-ketosteroids.

TABLE A

17β-Estradiol:

| | |
|---|---|
| $A_1$ | 3-methyl ether. |
| $A_2$ | 3-ethyl ether. |
| $A_3$ | 3-n. propyl ether. |
| $A_4$ | 3-i. propyl ether. |
| $A_5$ | 3-n. butyl ether. |
| $A_6$ | 3-isobutyl ether. |
| $A_7$ | 3-n. amyl ether. |
| $A_8$ | 3-isoamyl ether. |
| $A_9$ | 3-n. hexyl ether. |
| $A_{10}$ | 3-n. heptyl ether. |
| $A_{11}$ | 3-n. octyl ether. |
| $A_{12}$ | 3-n. nonyl ether. |
| $A_{13}$ | 3-cyclopropylmethyl ether. |
| $A_{14}$ | 3-cyclobutyl ether. |
| $A_{15}$ | 3-cyclopentyl ether. |
| $A_{16}$ | 3-cyclohexyl ether. |
| $A_{17}$ | 3-cyclooctyl ether. |
| $A_{18}$ | 3-tetrahydropyranyl ether. |
| $A_{19}$ | 3-benzyl ether. |
| $A_{20}$ | 3-(1'-ethoxy) ethyl ether. |
| $A_{21}$ | 3-acetate. |
| $A_{22}$ | 3-propionate. |
| $A_{23}$ | 3-butyrate. |
| $A_{24}$ | 3-isobutyrate. |
| $A_{25}$ | 3-valerate. |
| $A_{26}$ | 3-trimethylacetate. |
| $A_{27}$ | 3-enanthate. |
| $A_{28}$ | 3-benzoate. |
| $A_{29}$ | 3-o. toluate. |
| $A_{30}$ | 3-p. toluate. |
| $A_{31}$ | 3-p. chlorobenzoate. |
| $A_{32}$ | 3-cyclopentylcarboxylate. |
| $A_{33}$ | 3-cyclopentylpropionate. |
| $A_{34}$ | 3-phenoxyacetate. |

17α-Estrodiol:

| | |
|---|---|
| $A_{35}$ | 3-isobutyl ether |
| $A_{36}$ | 3-n. heptyl ether. |
| $A_{37}$ | 3-propionate. |
| $A_{38}$ | 3-isobutyrate. |
| $A_{39}$ | 3-acetate. |
| $A_{40}$ | 3-cyclopentylpropionate. |
| $A_{41}$ | 3-benzoate. |
| $A_{42}$ | 3-enanthate. |

17β-Estradiol:

| | |
|---|---|
| $A_{43}$ | 3-methyl ether. |

TABLE B

| | |
|---|---|
| $B_1$ | 3-ethoxy-19-norandrostan-17-one. |
| $B_2$ | 3-ethoxyandrosta-3,5-dien-17β-ol propionate. |
| $B_3$ | 1α,3,3-trimethoxy-5α-androstan-17β-ol acetate. |
| $B_4$ | 3,3-dimethoxy-5α-androstan-17β-ol propionate. |
| $B_5$ | 3-ethoxy-19-nor-17α-pregna-3,5-dien-20-yn-17β-ol propionate. |
| $B_6$ | 3-methoxy-5α-androstan-17β-ol acetate. |
| $B_7$ | 3-ethoxy-5α-androstan-17β-ol enanthate. |
| $B_8$ | 3,3-dimethoxy-5β-androstan-17β-ol propionate. |
| $B_9$ | 3-ethoxy-9α-fluoro-17α-methyl-5α-androstan-11-one-17β-ol acetate. |
| $B_{10}$ | 3-ethoxy-9α-fluoro-17α-methyl-5α-androstan-11β,17β-diol 17-acetate. |
| $B_{11}$ | 1α,3,3-trimethoxy-5α-androstan-17β-ol benzoate. |
| $B_{12}$ | 3-ethoxyandrosta-3,5-dien-17-one. |
| $B_{13}$ | 3-ethoxyandrosta-3,5-dien-17β-ol acetate. |
| $B_{14}$ | 3-ethoxy-17α-methylandrosta-3,5-dien-17β-ol enanthate. |
| $B_{15}$ | 3-methoxy-17α-methylandrosta-3,5-dien-17β-ol acetate. |
| $B_{16}$ | 3-ethoxy-19-norandrosta-3,5-dien-17-one. |
| $B_{17}$ | 3,3-dimethoxy-6α-methyl-5α-androstan-17β-ol isobutyrate. |
| $B_{18}$ | 3-ethoxy-9α-bromo-androsta-3,5-dien-11β-ol-17-one. |
| $B_{19}$ | 3-ethoxy-9α-fluoro-androsta-3,5-dien-11β, 17β-diol 17-propionate. |
| $B_{20}$ | 3-ethoxy-9α-fluoro-17α-methylandrosta-3,5-dien-11β,17β-diol 17-acetate. |
| $B_{21}$ | 3-ethoxy-9α-fluoro-11β, 16α-dihydroxy androsta-3,5-dien-17-one 16-propionate. |
| $B_{22}$ | 3-ethoxy-19-norandrosta-3,5-dien-17β-ol benzoate |
| $B_{23}$ | 3-ethoxy-19-norandrosta-3,5-dien-17β-ol acetate. |
| $B_{24}$ | 3-methoxy-6-fluoroandrosta-1,3,5-trien-11, 17-dione. |
| $B_{25}$ | 3-methoxy-6-methylandrosta-1,3,5-trien-11, 17-dione. |
| $B_{26}$ | 3,3-dimethoxy-1α-methyl-5α-androstan-17β-ol acetate. |
| $B_{27}$ | 3,3-dimethoxy-1α-methyl-19-norandrostan-17β-ol butyrate. |
| $B_{28}$ | 3,3-dimethoxy-2α-methyl-5α-androstan-17β-ol propionate. |
| $B_{29}$ | 3,3-dimethoxy-1α-methyl-5β-androstan-17β-ol enanthate. |
| $B_{30}$ | 3,3-dimethoxy-2α-methyl-5α-androstan-17β-ol acetate. |
| $B_{31}$ | 3,3-dimethoxy-2α-methyl-5β-androstan-17-one. |
| $B_{32}$ | 3,3-dimethoxy-2α-methyl-19-norandrostan-17β-ol propionate. |
| $B_{33}$ | 3,3-dimethoxy-2α, 17α-dimethyl-5α-androstan-17β-ol acetate. |
| $B_{34}$ | 3-methoxy-1-methyl-5α-androsta-1,3-dien-17β-ol enanthate. |
| $B_{35}$ | 3-methoxy-1-methyl-5α-androsta-1,3-dien-17β-ol acetate. |
| $B_{36}$ | 3-methoxy-9α-fluoro-17α-methylandrosta-3,5-dien-11β, 17β-diol 17-acetate. |
| $B_{37}$ | 3-ethoxy-17α-methyl-19-norandrosta-3,5-dien-17β-ol acetate. |
| $B_{38}$ | 3-ethoxy-17α-ethyl-19-norandrosta-3,5-dien-17β-ol acetate. |
| $B_{39}$ | 3-ethoxy-16α,17α-diacetoxyandrosta-3,5-diene. |
| $B_{40}$ | 3-ethoxy-11β-hydroxy-6-methylandrosta-3,5-dien-17-one. |
| $B_{41}$ | 3-ethoxy-16β-fluoro-androsta-3,5-dien-17-one. |
| $B_{42}$ | 3-ethoxy-16β-chloro-androsta-3,5-dien-17-one. |
| $B_{43}$ | 3-ethoxy-16α-methyl-19-norandrosta-3,5-dien-17-one. |
| $B_{44}$ | 3-ethoxy-16β-methyl-19-norandrosta-3,5-dien-17-one. |
| $B_{45}$ | 3,3-dimethoxy-17α-methyl-11β,17β-dihydroxy-5β-androstane 17 acetate. |
| $B_{46}$ | 3,3-dimethoxy-9α-fluoro-17α-methyl-17β-hydroxy-5α-androstan-11-one 17-propionate. |
| $B_{47}$ | 3-ethoxy-17α-methyl-estra-3,5-dien-17β-ol propionate. |
| $B_{48}$ | 3-ethoxy-17α-ethyl-estra-3,5-dien-17β-ol enanthate. |
| $B_{49}$ | 3-ethoxy-17α-vinyl-estra-3,5-dien-17β-ol acetate. |
| $B_{50}$ | 3-ethoxy-16β-methyl-estra-3,5-dien-17β-ol-β-phenylpropionate. |
| $B_{51}$ | 3-ethoxy-11β-hydroxy-estra-3,5-dien-17β-ol acetate. |
| $B_{52}$ | 3-ethoxy-17α-propyl-estra-3,5-dien-17β-ol acetate. |
| $B_{53}$ | 3-ethoxy-19-nor-17α-pregna-3,5-dien-20-yn-17β-ol acetate. |
| $B_{54}$ | 3-ethoxy-19-nor-17α-pregna-3,5-dien-20-yn-17β-ol enanthate. |
| $B_{55}$ | 3,3-dimethoxy-13β-ethylgonan-17-one. |
| $B_{56}$ | 3,3-dimethoxy-13β-ethylgonan-17β-ol acetate. |
| $B_{57}$ | 3,3-dimethoxy-13β,17α-diethylgonane-11β,17β-diol 17-acetate. |
| $B_{58}$ | 3,3-dimethoxy-13β-ethyl-17α-ethynylgonan-17β-ol acetate. |
| $B_{59}$ | 3,3-dimethoxy-2α-methyl-13β-ethylgonan-17β-ol acetate. |
| $B_{60}$ | 3-ethoxy-13β-ethylgona-3,5-dien-17β-ol acetate. |
| $B_{61}$ | 3-ethoxy-13β-ethyl-17α-methylgona-3,5-dien-17β-ol acetate. |
| $B_{62}$ | 3-ethoxy-13β,17α-diethylgona-3,5-dien-17β-ol acetate. |
| $B_{63}$ | 3-ethoxy-13β-ethyl-17α-vinylgona-3,5-dien-17β-ol acetate. |
| $B_{64}$ | 3-ethoxy-13β-ethyl-17α-ethynylgona-3,5-dien-17β-ol acetate. |
| $B_{65}$ | 3-ethoxy-13β,17α-diethylgona-3,5-dien-17β-ol benzoate. |
| $B_{66}$ | 3-ethoxy-13β-ethylgona-3,5-dien-17-one. |
| $B_{67}$ | 3-methoxypregna-3,5-dien-20-one. |
| $B_{68}$ | 3-ethoxy-17α-hydroxypregna-3,5-dien-20-one acetate. |
| $B_{69}$ | 3-ethoxy-6-methyl-17α-hydroxypregna-3,5-dien-20-one acetate. |
| $B_{70}$ | 3-ethoxy-21-hydroxypregna-3,5-dien-20-one acetate. |
| $B_{71}$ | 3-ethoxy-17α,21-dihydroxypregna-3,5-diene-11,20-dione 21-acetate. |
| $B_{72}$ | 3-ethoxy-17α,21-dihydroxypregna-3,5-diene-11,20-dione 21-butyrate. |
| $B_{73}$ | 3-methoxy-9α-fluoro-17α, 21-dihydroxy-16β-methylpregna-3,5-diene-11,20-dione 21-acetate. |
| $B_{74}$ | 3-methoxy-11β, 17α,21-trihydroxypregna-3, 5-dien-20-one 21-acetate. |
| $B_{75}$ | 3-methoxy-11β, 17α,21-trihydroxypregna-3,5-dien-20-one 21-trimethylacetate. |
| $B_{76}$ | 3-ethoxy-11β,17α,21-trihydroxypregna-3,5-dien-20-one 17-butyrate, 21-acetate. |
| $B_{77}$ | 3-ethoxy-11β,17α,21-trihydroxypregna-3,5-dien-20-one 17,21-diacetate. |
| $B_{78}$ | 3-ethoxy-9α-fluoro-11β,17α,21-trihydroxy-16β-methylpregna-3,5-dien-20-one 21-acetate. |
| $B_{79}$ | 3-methoxy-17α,21-dihydroxypregna-1,3-5-triene 11,20-dione 21-acetate. |
| $B_{80}$ | 3-ethoxy-19-nor-pregna-3, 5-dien-20-one. |
| $B_{81}$ | 3-ethoxycholesta-3,5-diene. |
| $B_{82}$ | 3-ethoxy-17α-hydroxy-19-norpregna-3,5-dien-20-one 17-acetate. |
| $B_{83}$ | 3-ethoxy-17α-hydroxy-19-norpregna-3,5-dien-20-one 17-caproate. |
| $B_{84}$ | 3-ethoxy-6-chloro-17α-hydroxypregna-3, 5-dien-20-one acetate. |
| $B_{85}$ | 3-ethoxy-16α,17α-(1'-methylbenzylidenedioxy)-pregna-3,5-dien-20-one. |
| $B_{86}$ | 3-ethoxy-9α-fluoropregna-3, 5-diene-11β,17α-diol-20-one 17-acetate. |
| $B_{87}$ | 3-ethoxy-16-methylene-pregna-3,5-dien-17α-ol-20-one acetate. |
| $B_{88}$ | 3-methoxypregna-1,3,5-triene-11β, 17α, 21-triol-20-one 21-acetate. |
| $B_{89}$ | 3-methoxy-9α-fluoro-16β-methylpregna-1,3,5-triene-11β, 17α, 21-triol-20-one 21-acetate. |
| $B_{90}$ | 3-methoxy-9α-fluoro-16α-methylpregna-1,3,5-triene-11β, 17α, 21 triol-20-one 21 acetate. |
| $B_{91}$ | 3-methoxy-9α, 11β dichloro-17α, 21-dihydroxypregna-1,3,5-trien-20-one 21-acetate. |
| $B_{92}$ | 3-ethoxy-9α, 11β-dichloro-17α, 21-dihydroxypregna-3,5-dien-20-one 21-acetate. |
| $B_{93}$ | 3-methoxy-9α, 11β-dichloro-17α, 21-dihydroxy-16α-methylpregna-1,3,5-trien-20-one 21 acetate. |
| $B_{94}$ | 3-ethoxy-9α-fluoro-16α, 17α-isopropylidenedioxypregna-1,3,5-triene-11β, 21-diol-20-one 21-acetate. |
| $B_{95}$ | 3-ethoxy-9α-fluoro-pregna-3,5-diene-11β, 17α, 21-triol-20 one 21-acetate. |
| $B_{96}$ | 3-ethoxy-6α, 9α-difluoro-pregna-3,5-diene-11β, 17α, 21-triol-20-one 17-acetate, 21-acetate. |
| $B_{97}$ | 3-methoxy-17α, 21-cyclopentylidenedioxypregna-3,5-diene-11, 20-dione. |

TABLE—Continued

B98 — 3-ethoxy-pregna-3,5-dien-20α-ol acetate.
B99 — 3-ethoxy-11β, 18-oxido-pregna-3,5-dien-18, 21-diol-20-one 18-benzoate, 21-acetate.
B100 — 3-ethoxy-11β, 18-oxido-pregna-3,5-dien-18, 21-diol-20-one 18, 21-di-p. chlorobenzoate.
B101 — 3-methoxy-1α-acetylmercapto-androsta-3,5-dien-17β-ol acetate.
B102 — 3-ethoxy-9α-fluoro-16β-methylpregna-1,3,5-triene-17α, 21-diol-11, 20-dione 17,21-diacetate.
B103 — 3-ethoxy-9α-fluoro-16β-methylpregna-1,3,5-triene-11β,17α, 21-triol-20-one 17,21-diacetate.
B104 — 3-ethoxy-9α-fluoro-16β-methylpregna-1,3,5-triene-17α, 21-diol-11, 20-dione 21-acetate.
B105 — 3-ethoxy-9α-fluoro-16-methylene-pregna-1,3,5-triene-17α, 21-diol-11, 20-dione-21-acetate.
B106 — 3-ethoxy-19-nor-17α-pregna-3,5-dien-20-yn-17β-ol enanthate.

The following examples are given to illustrate the invention without limiting it.

EXAMPLE 1

17β-(17'-oxo-19'-nor-androsta-3',5'-dien-3'-yloxy)-estra-1,3,5(10)-trien-3-ol benzoate 5 g. 19-nor-androst-4-en-3,17-dione 3-ethyl enol ether were added to a boiling solution containing 6.5 g. estradiol 3-benzoate and 50 mg. p. toluenesulfonic acid in 800 ml. toluene and the mixture was heated with rapid solvent distillation for about 60 minutes. After addition of some drops of pyridine and complete removal of the solvent under reduced pressure, the residue was taken up with methanol, filtered and recrystallised from methylene chloride: ethanol to give 8 g. 17β-(17'-oxo-19'-nor-androsta-3',5'-dien-3'-yloxy)-estra-1,3,5(10)-trien - 3 - ol benzoate, melting at 272-278° C. By further recrystallisation a melting point of 283-286° C. and $[\alpha]_D = -33°$ C. (dioxan, c.=1%) were obtained.

EXAMPLE 2

17β-(17'β-propionoxy-androsta-3'5'-dien-3'-yloxy)-estra-1,3,5(10)- trien-3-ol benzoate A mixture of 1.5 g. testosterone 3-ethyl enol ether 17-propionate and 1.5 g. estradiol 3-benzoate in 20 ml. dimethylformamide was treated with 15 g. p. toluenesulfonic acid, then heated on an oil bath at 120-150° C. for 40 minutes and successively at 180-200° C. for 20 minutes. After addition of some drops of pyridine and removal of the solvent under reduced pressure, the residue was taken up with methanol, filtered and recrystallised from methylene chloride: methanol to give 2 g. 17β-(17'β-propionoxy-androsta-3',5'-dien-3'-yloxy)-estra-1,3,5(10)-trien - 3 - ol benzoate, melting at 221-224° C. $[\alpha]_D = -58°$ C. (dioxan, c.=1%).

EXAMPLE 3

17β-(17'β-acetoxy-5'α-androsta-1',3'-dien-3'-yloxy)-estra-1,3,5(10)-trien-3-ol benzoate Grams 2 1α,3α3β-trimethoxy-5α-androstan-17β-ol acetate were added to an anhydrous boiling solution of 2 g. estradiol 3-benzoate and 60 mg. pyridine p. toluenesulfonate in 1000 ml. benzene. The mixture was heated with solvent distillation for 150 minutes. After addition of some drops of pyridine and complete removal of the solvent under reduced pressure, the residue was taken up with methanol, filtered and recrystallised from methylene chloride:methanol to give 1.6 g. 17β(17'β-acetoxy-5'α-androsta-1',3'-dien-3'-yloxy)-estra - 1,3,5(10) - trien-3-ol benzoate melting at 270-275° C., $[\alpha]_D = +41.5°$ (dioxan, c.=1%).

EXAMPLE 4

3-heptyloxy-17β-(17'β-propionoxy-5'α-androst-2'-en-3'-yloxy)-estra-1,3,5(10)-triene A mixture of 2.7 g. 5α-dihydrotestosterone 17-propionate 3,3-dimethyl acetal and 2.7 g. estradiol 3-n-heptyl ether in 15 ml. dimethylformamide was treated with 15 mg. p. toluene sulfonic acid by operating as above described in Example 2, to give 3.2 g. 3-heptyloxy-17β-(17'β - propionoxy - 5'α - androst-2'-en-3'-yloxy)-estra-1,3,5(10)-triene melting at 152-156° C., $[\alpha]_D = +49.5°$ C. (dioxan, c.=0.5%).

EXAMPLE 5

17β-(17'β-enanthoxy-19'-nor-17'α-pregna-3',5'-dien-20'-yn-3'-yloxy)-estra-1,3,5(10)-trien-3-ol acetate A solution of 3 g. 17α-ethynyl-19-nortestosterone 17-enanthate in 3 ml. anhydrous tetrahydrofurane and 2.4 ml. ethanol was treated with 3 ml. triethylorthoformiate and 30 mg. p. toluenesulfonic acid and kept at room temperature for 45 minutes under occasional stirring. After addition of 0.03 ml. pyridine the excess of triethylorthoformiate was removed by evaporation under reduced pressure and the oily residue was dissolved in 20 ml. benzene and added to a boiling solution of 3.8 g. estradiol 3-acetate and pyridine p. toluenesulfonate in 5.000 ml. benzene. The reaction mixture was heated with rapid solvent distillation for about 30 minutes, then 0.4 ml. pyridine were added. After complete removal of the solvent under reduced pressure, the residue was taken up with ethanol and filtered, to give 3.7 g. 17β-(17'β-enanthoxy - 19' - nor - 17'α-pregna-3',5'-dien-20'-yn-3'-yloxy)-estra-1,3,5(10)-trien-3-ol acetate, melting at 120-126° C. The product, dissolved in benzene, filtered through alumina and successively recrystallised from ether-methanol showed a melting point of 140-143° C. (with softening 120° C.), $[\alpha]_D = -92.5°$ C. (dioxan, c.=1%).

TABLE VII

| Ex. No. | Disteroidyl ether | Prepared from— |
|---|---|---|
| 6 | 3-heptyloxy-17β-(17'β-acetoxy-5'α-androst-2'-en-3'-yloxy)-estra-1,3,5(10)-triene. | A10+B6 |
| 7 | 17β-(17'β-acetoxy-5'α-androst-2'-en-3'-yloxy)-estra-1,3,5(10)-trien-3-ol benzoate. | A28+B6 |
| 8 | 17β-(17'β-entanhoxy-5'α-androst-2'-en-3'-yloxy)-estra-1,3,5(10)-trien-3-ol enanthate. | A27+B7 |
| 9 | 17β-(17'β-propionoxy-5'β-androst-3'-en-3'-yloxy)-estra-1,3,5(10)-trien-3-ol benzoate. | A28+B8 |
| 10 | 17β-(9'α-fluoro-11'-oxo-17'β-acetoxy-17'α-methyl-5'α-androst-2'-en-3'-yloxy-estra-1,3,5(10)-trien-3-ol benzoate. | A28+B9 |
| 11 | 17β-(9'α-fluoro-11'β-hydroxy-17'β-acetoxy-17'α-methyl-5'α-androst-2'-en-3'-yloxy)-estra-1,3,5(10)-trien-3-ol benzoate. | A28+B10 |
| 12 | 17β-(17'β-benzoyloxy-5'α-androsta-1',3'-dien-3'-yloxy)-estra-1,3,5(10)-trien-3-ol enanthate. | A27+B11 |
| 13 | 17β-(17'-oxo-androsta-3',5'-dien-3'-yloxy)-estra-1,3,5(10)-trien-3-ol benzoate. | A28+B12 |
| 14 | 17β-(17'-oxo-androsta-3',5'-dien-3'-yloxy)-estra-1,3 5(10)-trien 3-ol o. toluate. | A29+B12 |
| 15 | 3-cyclohexyloxy-17β (17'β-enanthoxy-17'α-methyl-androsta-3', 5'-dien-3'-yloxy)-estra-1,3,5(10)-triene. | A16+B14 |
| 16 | 17β-(17'β-acetoxy-17'α-methylandrosta-3',5'-dien-3'-yloxy)-estra-1,3,5(10)-trien-3-ol benzoate. | A28+B15 |
| 17 | 17β-(17'-oxo-19'-norandrosta-3',5'-dien-3'-yloxy)-estra-1,3,5(10)-trien-3-ol acetate. | A21+B16 |
| 18 | 17β-(17'-oxo-19'-norandrosta-3',5'-dien-3'-yloxy)-estra-1,3 5(10)-trien-3-ol propionate. | A22+B16 |
| 19 | 17β-(17'-oxo-19'-norandrosta-3',5'-dien-3'-yloxy)-estra-1,3,5(10)-trien-3-ol enanthate. | A27+B16 |
| 20 | 3-cyclohexyloxy-17β-(17'-oxo-19'-norandrosta-3',5'-dien-3'-yloxy)-estra-1,3,5(10)-triene. | A16+B16 |
| 21 | 17β-(17'β-isobutyroxy-6'α-methyl-5'α-androst-2'-en-3'-yloxy)-estra-1,3,5(10)-trien-3-ol benzoate. | A28+B17 |
| 22 | 3-heptyloxy-17β-(9'α-bromo-11'-hydroxy-17'-oxo-androsta-3',5'-dien-3'-yloxy)-estra-1,3,5(10)-triene. | A10+B18 |
| 23 | 17β-(9'α-fluoro-11'β-hydroxy-16'α-propionoxy-17'-oxoandrosta-3',5'-dien-3'-yloxy)-estra-1,3,5(10)-trien-3-ol benzoate. | A28+B21 |
| 24 | 17β-(17'β-benzoyloxy-19'-norandrosta-3',5'-dien-3'-yloxy)-estra-1,3,5(10)-trien-3-ol benzoate. | A28+B22 |
| 25 | 17β-(6'α-fluoro-11',17'-dioxo-androsta-1',3',5'-trien-3'-yloxy)-estra-1,3,5(10)-trien-3-ol cyclopentyl-carboxylate. | A32+B24 |
| 26 | 17β-(11',17'-dioxo-6'-methylandrosta-1',3',5'-trien-3'-yloxy)-estra-1,3,5(10)-trien-3-ol enanthate. | A27+B25 |
| 27 | 17β-(17'β-butyroxy-1'α-methyl-19'-norandrost-2'-en-3'-yloxy)-estra-1,3,5(10)-trien-3-ol butyrate. | A23+B27 |
| 28 | 17β-(17'β-propionoxy-2'-methyl-5'α-androst-2'-en-3'-yloxy)-estra-1,3,5(10)-trien-3-ol benzoate. | A28+B28 |
| 29 | 17β-(17'β-acetoxy-2',17'α-dimethyl-5'α-androst-2'-en-3'-yloxy)-estra-1,3,5(10)-trien-3-ol benzoate. | A28+B33 |
| 30 | 17β-(11'β-hydroxy-17'-oxo-6'-methylandrosta-3',5'-dien-3'-yloxy)-estra-1,3,5(10)-trien-3-ol benzoate. | A28+B40 |
| 31 | 3-n. heptyloxy-17β-(16'β-fluoro-17'-oxoandrosta-3,'5'-dien-3'-yloxy)-estra-1,3,5(10)-triene. | A10+B41 |
| 32 | 3-n. hexyloxy-17β-(16'β-chloro-17'-oxoandrosta-3', 5'-dien-3'-yloxy)-estra-1,3,5(10)-triene. | A9+B42 |
| 33 | 3-n. propyloxy-17β-(17'-oxo-16'α-methyl-19'-norandrosta-3',5'-dien-3'-yloxy)-estra-1,3,5(10)-triene. | A3+B43 |
| 34 | 17β-(11'β-hydroxy-17'β-acetoxy-17'α-methyl-5'α-androst-3'-en-3'-yloxy)-estra-1,3,5(10)-trien-3-ol cyclopentylpropionate. | A33+B45 |
| 35 | 17β-(9'α-fluoro-11'-oxo-17'β-propionoxy-17'α-methyl-5'α-androst-3'-en-3'-yloxy)-estra-1,3,5(10)-trien-3-ol cyclopentylpropionate. | A33+B46 |

TABLE VII—Continued

| Ex. No. | Disteroidyl ether | Prepared from— |
|---|---|---|
| 36 | 17β-(17'β-acetoxy-19'-nor-17'α-pregna-3',5'-dien-20'-yn-3'-yloxy)-estra-1,3,5(10)-trien-3-ol acetate. | $A_{21}+B_{53}$ |
| 37 | 17β-(17'β-acetoxy-19'-nor-17'α-pregna-3',5'-dien-20'-yn-3'-yloxy)-estra-1,3,5(10)-trien-3-ol butyrate. | $A_{23}+B_{53}$ |
| 38 | 17β-(17'β-acetoxy-19'-nor-17'α-pregna-3',5'-dien-20'-yn-3'-yloxy)-estra-1,3,5(10)-trien-3-ol enanthate. | $A_{27}+B_{53}$ |
| 39 | 17β-(17'β-acetoxy-19'-nor-17'α-pregna-3',5'-dien-20'-yn-3'-yloxy)-estra-1,3,5(10)-trien-3-ol benzoate. | $A_{28}+B_{53}$ |
| 40 | 3-cyclopentyloxy-17β-(17'β-acetoxy-19'-nor-17'α-pregna-3',5'-dien-20'-yn-3'-yloxy)-estra-1,3,5(10)-triene. | $A_{15}+B_{53}$ |
| 41 | 3-(1'-ethoxy)ethoxy-17β-(17'β-acetoxy-19'-nor-17'α-pregna-3',5'-dien-20'-yn-3'-yloxy)-estra-1,3,5(10)-triene. | $A_{20}+B_{53}$ |
| 42 | 17β-(17'β-enanthoxy-19'-nor-17'α-pregna-3',5'-dien-20'-yn-3'-yloxy)-estra-1,3,5(10)-trien-3-ol isobutyrate. | $A_{24}+B_{54}$ |
| 43 | 17β-(17'β-enanthoxy-19'-nor-17'α-pregna-3',5'-dien-20'-yn-3'-yloxy)-estra-1,3,5(10)-trien-3-ol enanthate. | $A_{27}+B_{54}$ |
| 44 | 17β-(17'β-enanthoxy-19'-nor-17'α-pregna-3',5'-dien-20'-yn-3'-yloxy)-estra-1,3,5(10)-trien-3-ol propionate. | $A_{22}+B_{54}$ |
| 45 | 17β-(17'β-enanthoxy-19'-nor-17'α-pregna-3',5'-dien-20'-yn-3'-yloxy)-estra-1,3,5(10)-trien-3-ol benzoate. | $A_{28}+B_{54}$ |
| 46 | 3-methoxy-17β-(17'β enanthoxy-19'-nor-17'α-pregna-3',5'-dien-20'-yn-3'-yloxy)-estra-1,3,5(10)-triene. | $A_1+B_{54}$ |
| 47 | 3-cyclopentyloxy-17β-(17'β-enanthoxy-19'-nor-17'α-pregna-3',5'-dien-20'-yn-3'-yloxy)-estra-1,3,5(10)-triene. | $A_{15}+B_{54}$ |
| 48 | 17α-(17'β-acetoxy-19'-nor-17'α-pregna-3',5'-dien-20'-yn-3'-yloxy)-estra-1,3,5(10)-trien-3-ol benzoate. | $A_{41}+B_{53}$ |
| 49 | 17β-(20'-oxopregna-3',5'-dien-3'-yloxy)-estra-1,3,5(10)-trien-3-ol benzoate. | $A_{28}+B_{67}$ |
| 50 | 17β-(17'α-acetoxy-20'-oxopregna-3',5'-dien-3'-yloxy)-estra-1,3,5(10)-trien-3-ol benzoate. | $A_{28}+B_{68}$ |
| 51 | 17β-(17'α-acetoxy-20'-oxo-6'-methylpregna-3',5'-dien-3'-yloxy)-estra-1,3,5(10)-trien-3-ol benzoate. | $A_{28}+B_{69}$ |
| 52 | 17β-(20'-oxo-21'-acetoxypregna-3',5'-dien-3'-yloxy)-estra-1,3,5(10)-trien-3-ol benzoate. | $A_{28}+B_{70}$ |
| 53 | 17β-(11',20'-dioxo-17'α-hydroxy-21'-acetoxypregna-3',5'-dien-3'-yloxy)-estra-1,3,5(10)-trien-3-ol benzoate. | $A_{28}+B_{71}$ |
| 54 | 3-cyclopentyloxy-17β-(11',20'-dioxo-17'α-hydroxy-21'-acetoxypregna-3',5'-dien-3'-yloxy)-estra-1,3,5(10)-triene. | $A_{15}+B_{71}$ |
| 55 | 17β-(11',20'-dioxo-17'α-hydroxy-21'-butyroxypregna-3',5'-dien-3'-yloxy)-estra-1,3,5(10)-trien-3-ol propionate. | $A_{22}+B_{72}$ |
| 56 | 17β-(9'-fluoro-11',20'-dioxo-17'α-hydroxy-21'-acetoxy-16'β-methylpregna-3',5'-dien-3'-yloxy)-estra-1,3,5(10)-trien-3-ol benzoate. | $A_{28}+B_{73}$ |
| 57 | 17β-(11'β,17'α-dihydroxy-20'-oxo-21'-acetoxypregna-3',5'-dien-3'-yloxy)-estra-1,3,5(10)-trien-3-ol benzoate. | $A_{28}+B_{74}$ |
| 58 | 17β-(11'β,17'α-dihydroxy-20'-oxo-21'-trimethyl acetoxypregna-3',5'-dien-3'-yloxy)-estra-1,3,5(10)-trien-3-ol enanthate. | $A_{27}+B_{75}$ |
| 59 | 17β-(11'β-hydroxy-20'-oxo-17'α-butyroxy-21'-acetoxypregna-3',5'-dien-3'-yloxy)-estra-1,3,5(10)-trien-3-ol acetate. | $A_{21}+B_{76}$ |
| 60 | 17β-(11'β-hydroxy-20'-oxo-17'α,21'-diacetoxypregna-3',5'-dien-3'-yloxy)-estra-1,3,5(10)-trien-3-ol propionate. | $A_{22}+B_{77}$ |
| 61 | 17β-(9'α-fluoro-11'β17'α,-dihydroxy-20'-oxo-21'-acetoxy-16'β-methylpregna-3',5'-dien-3'-yloxy)-estra-1,3,5(10)-trien-3-ol benzoate. | $A_{28}+B_{78}$ |
| 62 | 17β-(11',20'-dioxo-17'α-hydroxy-21'-acetoxypregna-1',3',5'-trien-3'-yloxy)-estra-1,3,5(10)-trien-3-ol benzoate. | $A_{28}+B_{79}$ |
| 63 | 17β-(19'-nor-20'-oxo-pregna-3',5'-dien-3'-yloxy)-estra-1,3,5(10)-trien-3-ol benzoate. | $A_{28}+B_{80}$ |
| 64 | 17β-(19'-nor-20'-oxo-pregna-3',5'-dien-3'-yloxy)-estra-1,3,5(10)-trien-3-ol propionate. | $A_{22}+B_{80}$ |
| 65 | 17β-(cholesta-3',5'-dien-3'-yloxy)-estra-1,3,5(10)-trien-3-ol benzoate. | $A_{31}+B_{81}$ |
| 66 | 17β-(17'α-acetoxy-19'-nor-20'-oxopregna-3',5'-dien-3'-yloxy)-estra-1,3,5(10)-trien-3-ol p. chlorobenzoate. | $A_{31}+B_{82}$ |
| 67 | 17β-(17'α-capronoxy-19'-nor-20'-oxopregna-3',5'-dien-3'-yloxy)-estra-1,3,5(10)-trien-3-ol enanthate. | $A_{27}+B_{83}$ |
| 68 | 17β-(17'β-acetoxy-1'-methyl-5'α-androst-2'-en-3'-yloxy)-estra-1,3,5(10)-trien-3-ol acetate. | $A_{21}+B_{26}$ |
| 69 | 17β-(17'β-enanthoxy-1'-methyl-5'α-androsta-1',3'-dien-3'-yloxy)-estra-1,3,5(10)-trien-3-ol propionate. | $A_{22}+B_{34}$ |
| 70 | 17β-(17'β-acetoxy-1'-methyl-5'α-androsta-1',3'-dien-3'-yloxy)-estra-1,3,5(10)-trien-3-ol propionate. | $A_{22}+B_{35}$ |
| 71 | 17β-(9'α-fluoro-11'β-hydroxy-17'β-acetoxy-17'α-methyl-androsta-3',5'-dien-3'-yloxy)-estra-1,3,5(10)-trien-3-ol benzoate. | $A_{28}+B_{36}$ |
| 72 | 17β-(17'β-acetoxy-17'α-methyl-19'-norandrosta-3',5'-dien-3'-yloxy)-estra-1,3,5(10)-trien-3-ol isobutyrate. | $A_{24}+B_{37}$ |
| 73 | 17β-(17'β-acetoxy-17'α-ethyl-19'-norandrosta-3',5'-dien-3'-yloxy)-estra-1,3,5(10)-trien-3-ol propionate. | $A_{22}+B_{38}$ |
| 74 | 17β-(16'α,17'α-diacetoxyandrosta-3',5'-dien-3'-yloxy)-estra-1,3,5(10)-trien-3-ol benzoate. | $A_{28}+B_{39}$ |
| 75 | 17β-(6'-chloro-17'α-acetoxy-20'-oxopregna-3',5'-dien-3'-yloxy)-estra-1,3,5(10)-trien-3-ol p. chlorobenzoate. | $A_{31}+B_{84}$ |
| 76 | 17β-[16'α,17'α-(1''-methylbenzylidenedioxy)-20'-oxopregna-3',5'-dien-3'-yloxy]-estra-1,3,5(10)-trien-3-ol p. toluate. | $A_{30}+B_{85}$ |
| 77 | 17β-(9'α-fluoro-11'β-hydroxy-17'α-acetoxy-20'-oxopregna-3',5'-dien-3'-yloxy)-estra-1,3,5(10)-trien-3-ol p. chlorobenzoate. | $A_{31}+B_{85}$ |
| 78 | 17β-(16'-methylen-17'α-acetoxy-20'-oxopregna-3',5'-dien-3'-yloxy)-estra-1,3,5(10)-trien-3-ol p. chlorobenzoate. | $A_{31}+B_{87}$ |
| 79 | 17β-(11'β,17'α-dihydroxy-20'-oxo-21'-acetoxypregna-1',3',5'-trien-3'-yloxy)-estra-1,3,5(10)-trien-3-ol butyrate. | $A_{23}+B_{88}$ |
| 80 | 17β-(9'α-fluoro-11'β, 17'α-dihydroxy-20'-oxo-21'-acetoxy-16'β-methyl-pregna-1',3',5'-trien-3'-yloxy)-estra-1,3,5(10)-trien-3-ol acetate. | $A_{21}+B_{89}$ |
| 81 | 17β-(9'α-fluoro-11'β, 17'α-dihydroxy-20'-oxo-21'-acetoxy-16'α-methyl-pregna-1',3',5'-trien-3'-yloxy)-estra-1,3,5(10)-trien-3-ol acetate. | $A_{21}+B_{90}$ |
| 82 | 17β-(9'α-fluoro-11'β-hydroxy-16'α,17'α-isopropylenedioxy-20'-oxo-21'-acetoxy-pregna-1',3',5'-trien-3'-yloxy)-estra-1,3,5(10)-trien-3-ol acetate. | $A_{21}+B_{94}$ |
| 83 | 3-cyclopentyloxy-17β-(9'α-fluoro-11'β, 17'α-dihydroxy-20'-oxo-21'-acetoxy-pregna-3',5'-dien-3'-yloxy)-estra-1,3,5(10)-triene. | $A_{15}+B_{95}$ |
| 84 | 17β-(6'α,9'α-difluoro-11'β-hydroxy-17'α-butyroxy-20'-oxo-21'-acetoxypregna-3',5'-dien-3'-yloxy)-estra-1,3,5(10)-trien-3-ol benzoate. | $A_{28}+B_{96}$ |
| 85 | 17β-(11',21'-dioxo-17'α,21'-cyclopentylidenedioxy-pregna-3',5'-dien-3'-yloxy)-estra-1,3,5(10)-trien-3-ol benzoate. | $A_{28}+B_{97}$ |
| 86 | 17α(20'α-acetoxypregna-3',5'-dien-3'-yloxy)-estra-1,5(10)-trien-3-ol benzoate. | $A_{41}+B_{98}$ |
| 87 | 17α-(20'-oxopregna-3',5'-dien-3'-yloxy)-estra.1,3,5(10)-trien-3-ol isobutyrate. | $A_{38}+B_{67}$ |
| 88 | 17α-(19'-nor-20'-oxopregna-3',5'-dien-3'-yloxy)-estra.1,3,5(10)-trien-3-ol benzoate. | $A_{41}+B_{80}$ |
| 89 | 17α-(17'α-acetoxy-19'-nor-20'-oxopregna-3',5'-dien-3'-yloxy)-estra-1,3,5(10)-trien-3-ol propionate. | $A_{37}+B_{82}$ |
| 90 | 17β-(11'β, 18'-oxido-18'-benzoyloxy-20'-oxo-21'-acetoxy-pregna-3',5'-dien-3'-yloxy)-estra-1,3,5(10)-trien-3-ol benzoate. | $A_{28}+B_{99}$ |
| 91 | 17β-(11'β,18'-oxido-18',21'-di-p. chlorobenzoyloxy-20'-oxo-pregna-3',5'-dien-3'-yloxy)-estra-1,3,5(10)-trien-3-ol p. chlorobenzoate. | $A_{31}+B_{100}$ |
| 92 | 17β-(17'β-acetoxy-13'β-ethyl-17'α-ethynylgona-3',5'-dien-3'-yloxy)-estra-1,3,5(10)-trien-3-ol propionate. | $A_{22}+B_{64}$ |
| 93 | 17β-(17'β-acetoxy estra-3',5'-dien-3'-yloxy)-estra-1,3,5(10)-trien-3-ol benzoate. | $A_{28}+B_{23}$ |
| 94 | 17β-(1'-acetylmercapto-17'β-acetoxyandrosta-3',5'-dien-3'-yloxy)-estra-1,3,5(10)-trien-3-ol benzoate. | $A_{28}+B_{101}$ |
| 95 | 3-cyclopentyloxy-17β-(17'-oxo-19'-norandrosta-3',5'-dien-3'-yloxy)-estra-1,3,5(10)-triene. | $A_{15}+B_{15}$ |
| 96 | 17β-(9'α-fluoro-11'β,20'-dioxo-17'α,21'-diacetoxy-16'β-methylpregna-1',3',5'-trien-3'-yloxy)-estra-1,3,5(10)-trien-3-ol benzoate. | $A_{28}+B_{102}$ |
| 97 | 17α-(9'α-fluoro-11'β,20'-dioxo-17'α,21'-diacetoxy-16'β-methylpregna-1',3',5'-trien-3'-yloxy)-estra-1,3,5(10)-trien-3-ol-benzoate. | $A_{41}+B_{102}$ |
| 98 | 17α-(9'α-fluoro-11'β-hydroxy-20'-oxo-17'α,21'-diacetoxy-16'β-methylpregna-1',3',5'-trien-3'-yloxy)-estra-1,3,5(10)-trien-3-ol benzoate. | $A_{41}+B_{103}$ |
| 99 | 17β-(9'α-fluoro-11'β,17'α-dihydroxy-20'-oxo-21'-acetoxy-16'β-methylpregna-1',3',5'-trien-3'-yloxy)-estra-1,3,5(10)-trien-3-ol benzoate. | $A_{28}+B_{89}$ |
| 100 | 17α-(9'α-fluoro-11'β,17'α-dihydroxy-20'-oxo-21'-acetoxy-16'β-methylpregna-1',3',5'-trien-3'-yloxy)-estra-1,3,5(10)-trien-3-ol benzoate. | $A_{41}+B_{89}$ |
| 101 | 17β-(9'α-fluoro-11'β,17'α-dihydroxy-20'-oxo-21'-acetoxy-16'α-methylpregna-1',3',5'-trien-3'-yloxy)-estra-1,3,5(10)-trien-3-ol benzoate. | $A_{28}+B_{90}$ |
| 102 | 17α-(9'α-fluoro-11',20'-dioxo-17'α-hydroxy-21'-acetoxy-16'β-methylpregna-1',3',5'-trien-3'-uloxy)-estra-1,3,5(10)-trien-3-ol benzoate. | $A_{41}+B_{104}$ |
| 103 | 17β-(9'α-fluoro-11',20'-dioxo-17'α-hydroxy-21'-acetoxy-16'β-methylpregna-1',3',5'-trien-3'-yloxy)-estra-1,3,5(10)-trien-3-ol-benzoate. | $A_{28}+N_{104}$ |
| 104 | 3-n.butyloxy-17β-(9'α-fluoro-11'β-hydroxy-17'β-propionoxy-androsta-3',5'-dien-3'-yloxy)-estra-1,3,5(10)-triene. | $A_5+B_{19}$ |
| 105 | 17β-(9'α-fluoro-11'β-hydroxy-17'β-acetoxy-17'α-methylandrosta-3',5'-dien-3'-yloxy)-estra-1,3,5(10)-trien-3-ol trimethylacetate. | $A_{26}+B_{20}$ |
| 106 | 17β-(17'β-enanthoxy-1'α-methyl-5'β-androst-3'-en-3'-yloxy)-estra-1,3,5(10)-trien-3-ol acetate. | $A_{21}+B_{29}$ |
| 107 | 17β-(17'-oxo-2α-methyl-5'β-androst-3'-en-3'-yloxy)-estra-1,3,5(10)-trien-3-ol propionate. | $A_{22}+B_{31}$ |
| 108 | 3-i.propyloxy-17β-propionoxy-2'-methyl-19'-norandrost-2'-en-3'-yloxy)-estra-1,3,5(10)-triene. | $A_4+B_{32}$ |
| 109 | 17β-(17'-oxo-16'β-methyl-19'-norandrosta-3',5'-dien-3'-yloxy)-estra-1,3,5(10)-trien-3-ol valerate. | $A_{25}+B_{44}$ |
| 110 | 3-octyloxy-17β-(17'β-hydroxy-17'α-ethylestra-3',5'-dien-3'-yloxy)-estra-1,3,5(10)-triene. | $A_{11}+B_{48}$ |
| 111 | 17β-(17'β-acetoxy-17'α-vinylestra-3',5'-dien-3'-yloxy)-estra-1,3,5(10)-trien-3-ol acetate. | $A_{21}+B_{49}$ |
| 112 | 17β-(17'β-phenylpropionoxy-16'β-methylestra-3',5'-dien-3'-yloxy)-estra-1,3,5(10)-trien-3-ol benzoate. | $A_{28}+B_{50}$ |
| 113 | 3-ethoxy-17β-(17'β-acetoxy-17'α-propylestra-3',5'-dien-3'-yloxy)-estra-1,3,5(10)-triene. | $A_2+B_{52}$ |
| 114 | 17β-(17'β-acetoxy-13'β-ethylgona-3',5'-dien-3'-yloxy)-estra-1,3,5(10)-trien-3-ol benzoate. | $A_{28}+B_{60}$ |
| 115 | 3-cyclopentyloxy-17β-(17'β-acetoxy-13'β-ethyl-17'α-methylgona-3',5'-dien-3'-yloxy)-estra-1,3,5(10)-triene. | $A_{15}+B_{61}$ |
| 116 | 3-tetrahydropyranyloxy-17β-(17'β-acetoxy-13'β, 17'α-diethylgona-3',5'-dien-3'-yloxy)-estra-1,3,5(10)-triene. | $A_{18}+B_{62}$ |
| 117 | 17α-(17'β-acetoxy-13'β-ethyl-17'α-vinylgona-3'-5'-dien-3'-yloxy)-estra-1,3,5(10)-trien-3-ol acetate. | $A_{39}+B_{63}$ |
| 118 | 17α-(17'β-acetoxy-13'β-ethyl-17'α-ethynylgona-3',5'-dien-3'-yloxy)-estra-1,3,5(10)-trien-3-ol propionate. | $A_{37}+B_{64}$ |
| 119 | 17β-(9'α, 11'β-dichloro-17'α-hydroxy-20'-oxo-21'-acetoxypregna-1',3',5'-trien-3'-yloxy)-estra-1,3,5(10)-trien-3-ol benzoate. | $A_{28}+B_{91}$ |
| 120 | 17β-(9'α, 11'β-dichloro-17'α-hydroxy-20'-oxo-21'-acetoxypregna-3',5'-dien-3'-yloxy)-estra-1,3,5(10)-trien-3-ol benzoate. | $A_{28}+B_{92}$ |

TABLE VII—Continued

| Ex. No. | Disteroidyl ether | Prepared from— |
|---|---|---|
| 121 | 17β-(9'α,11'β-dichloro-16'α-methyl-17'α-hydroxy-20'-oxo-21'-acetoxypregna-1',3',5'-trien-3'-yloxy)-estra-1,3,5(10)-trien-3-ol acetate. | $A_{21}+B_{93}$ |
| 122 | 17β-(17'β-enanthoxy-19'-nor-17α-pregna-3',5'-dien-20'-yn-3'-yloxy)-estra-1,3,5(10)-trien-3-ol. | $A_{43}+B_{54}$ |
| 123 | 17β-(17'β-enanthoxy-5'α-androst-2'-en-3'-yloxy)-estra-1,3,5(10)-trien-3-ol acetate. | $A_{21}+B_{7}$ |
| 124 | 17β-(17'β-enanthoxy-19'-nor-17'α-pregna-3',5'-dien-20'-yn-3'-yloxy)-estra-1,3,5(10)-trien-3-ol acetate. | $A_{21}+B_{54}$ |

EXAMPLE 125

17β-(17'β-hydroxy-19'-nor-17'α-pregna-3',5'-dien-20'-yn-3'-yloxy)-estra-1,3,5(10)-3-ol A suspension of 11.9 g. of 17β-(17'β-acetoxy-19'-nor-17'α - pregna-3',5'-dien-20'-yn-3'-yloxy)-estra-1,3,5(10)-trien-3-ol benzoate (Ex. 39) in 250 ml. methanol was treated with a 5% methanolic potassium hydroxide solution and refluxed for 7 hours. After evaporation under reduced pressure the residue was diluted with water, and 160 ml. 10% hydrochloric acid were added, and the mixture was bubbled through carbon dioxide for about 30 minutes. The precipitate was filtered, washed with water and crystallized from methanol to give 8.95 g. 17β-(17'β-hydroxy - 19'-nor-17'α-pregna-3',5'-dien-20'-yn-3'-yloxy)-estra-1,3,5(10)-trien-3-ol, melting at 260–263° C. $[\alpha]_D=-119°$ C. (dioxan, c.=1%).

According to the above procedure the following disteroidyl ethers are obtained.

TABLE VIII

| Ex. No. | Disteroidyl ether | Prepared from— |
|---|---|---|
| 126 | 17β-(17'β-hydroxy-5'α-androst-2'-en-3'-yloxy)-estra-1,3,5(10)-trien-3-ol. | End compound Ex. 7. |
| 127 | 17β-(17'β-hydroxy-17'α-methylandrosta-3',5'-dien-3'-yloxy)-estra-1,3,5-(10)-trien-3β-ol. | End compound Ex. 16. |
| 128 | 17β-(20'-oxo-21'-hydroxypregna-3',5'-dien-3'-yloxy)-estra-1,3,5(10)-trien-3-ol. | End compound Ex. 52. |
| 129 | 17β-(11',20'-dioxo-17'α,21'-dihydroxypregna-3',5'-dien-3'-yloxy)-estra-1,3,5(10)-trien-3-ol. | End compound Ex. 55. |
| 130 | 17β-(9'α-fluoro-11',20'-dioxo-17'α,21'-dihydroxy-16'β-methylpregna-3',5'-dien-3'-yloxy)-estra-1,3,5(10)-trien-3-ol. | End compound Ex. 56. |
| 131 | 17β-(17'α-hydroxy-19'-nor-20'-oxopregna-3',5'-dien-3'-yloxy)-estra-1,3,5-(10)-trien-3-ol. | End compouud Ex. 66. |
| 132 | 17α-(17'β-hydroxy-19'-nor-17'α-pregna-3',5'-dien-20'-yn-3'-yloxy)-estra-1,3,-5(10)-trien-3-ol. | End compound Ex. 48. |
| 133 | 17β-(17β-hydroxy-13'β-ethyl-17'α-ethynylgona-3',5'-dien-3'-yloxy)-estra-1,3,5(10)-trien-3-ol. | End compound Ex. 92. |
| 134 | 17β-(17'β-hydroxy-17'α-methylandrosta-3',5'-dien-3'-yloxy)-estra-1,3,5(10)-trien-3-ol. | End compound Ex. 16. |
| 135 | 17β-(17'β-hydroxy-19'-nor-17'α-pregna-3',5'-dien-20'-yn-3'-yloxy)-estra-1,3,5(10)-trien-3-ol. | End compound Ex. 45 and Ex. 39. |
| 136 | 17β-(17'-oxoandrosta-3',5'-dien-3'-yloxy)-estra-1,3,5(10)-trien-3-ol. | End compound Ex. 13 and Ex. 14. |
| 137 | 17β-(17'β-hydroxyestra-3',5'-dien-3'-yloxy)-estra-1,3,5(10)-trien-3-ol. | End compound Ex. 93. |
| 138 | 17β-(17'β-hydroxyandrosta-3',5'-dien-3'-yloxy)-estra-1,3,5(10)-trien-3-ol. | End compound Ex. 2. |
| 139 | 17β-(17'-oxoestra-3',5'-dien-3'-yloxy)-estra-1,3,5(10)-trien-3-ol. | End compound Ex. 17, Ex. 18 and Ex. 19. |
| 140 | 17α-(17'β-hydroxy-19'-nor-17'α-pregna-3',5'-dien-20'-yn-3'-yloxy)-estra-1,3,5(10)-trien-3 ol. | End Compound Ex. 48. |
| 141 | 17α-(9'α-fluoro-11'β,17'α,21'-trihydroxy-20'-oxo-16'β-methylpregna-1',3',5'-trien-3'-yloxy)-estra-1,3,5(10)-trien-3-ol. | End compound Ex. 98 and Ex. 100. |
| 142 | 17β-(11',20'-dioxo-17'α,21'-dihydroxypregna-3',5'-dien-3'-yloxy)-estra-1,3,5(10)-trien-3-ol. | End compound Ex. 53. |
| 143 | 17β-(11'β,17'α,21'-trihydroxy-20'-oxopregna-3',5'-dien-3'-yloxy)-estra-1,3,5(10)-trien-3-ol. | End compound Ex. 57. |
| 144 | 17β-(11',20'-dioxo-17'α,21'-dihydroxypregna-1',3',5'-trien-3'-yloxy)-estra-1,3,5(10)-trien-3-ol. | End compound Ex. 62. |
| 145 | 17β-(9'α-fluoro-11',20'-dioxo-17'α, 21'-dihydroxy-16'β-methylpregna-1',3',5'-trien-3'-yloxy)-estra-1,3,5(10)-trien-3-ol. | End compound Ex. 103; |
| 146 | 17α-(9'α-fluoro-11'20'-dioxo-17'α,21'-dihydroxy-16'β-methylprenga-1',3',5'-trien-3'-yloxy)-estra-1,3,5(10)-trien-3-ol. | End compound Ex. 102. |
| 147 | 17β-(17'-oxoestra-3',5'-dien-3'-yloxy)-estra-1,3,5(10)-trien-3-ol. | End compound Ex. 1 |

EXAMPLE 148

17β-(20'-oxo-21'-hydroxypregna-3',5'-dien-3'-yloxy)-estra-1,3,5(10)-trien-3-ol benzoate A solution of 1.80 g. of 17β-(20'-oxo-21'-acetoxypregna-3',-5'-dien-3'-yloxy)-estra - 1,3,5(10)-trien-3-ol benzoate (Ex. 52) in 90 ml. of tetrahydrofurane and 90 ml. of methanol kept under nitrogen, was treated with 1.80 ml. of 1M methanol solution of sodium methoxide. After stirring at room temperature for 20 minutes, the solvent was evaporated under reduced pressure and the residue taken up with water and filtered. A crystallization from methylene chloride-methanol gave 1.20 g. of crystals of 17β-(20'-oxo-21'-hydroxypregna - 3',5' - dien-3'-yloxy)-estra-1,3,5(10)-trien-3-ol benzoate, melting at 175–177° C. (dec.).

According to the above procedure the following disteroidyl ethers are obtained.

TABLE IX

| Ex. No. | Disteroidyl ether | Prepared from— |
|---|---|---|
| 149 | 17β-(11',20'-dioxo-17'α,21'-dihydroxypregna-3',5'-dien-3'-yloxy)-estra-1,3,5(10)-trien-3-ol 3-benzoate. | End compound Ex. 53. |
| 150 | 17β-(9'α-fluoro-11',20'-dioxo-17'α,21'-dihydroxy-16'β-methylpregna-3',5'-dien-3'-yloxy)-estra-1,3,5(10)-trien-3-ol 3-benzoate. | End compound Ex. 56. |
| 151 | 17β-(11'β,17'α,21'-trihydroxy-20'-oxopregna-3',5'-dien-3'-yloxy)-estra-1,3,5(10)-trien-3-ol 3-benzoate. | End compound Ex. 57. |
| 152 | 17β-(9'α-fluoro-11'β,17'α,21'-trihydroxy-20'-oxo-16'β-methylpregna-3',5'-dien-3'-yloxy)-estra-1,3,5(10)-trien-3-ol 3-benzoate. | End compound Ex. 61. |
| 153 | 17β-(11',20'-dioxo-17'α,21'-dihydroxypregna-1',3',5'-trien-3'-yloxy)-estra-1,3,5(10)-trien-3-ol 3-benzoate. | End compound Ex. 62. |
| 154 | 17β-(9'α-fluoro-11'β,17'α,21'-trihydroxypregna-20'-oxo-16'α-methylpregna-1',3',5'-trien-3'-yloxy)-estra-1,3,5(10)-trien-3-ol 3-benzoate. | End compound Ex. 101. |

EXAMPLE 155

17β-(17'β-acetoxy-19'-nor-17'α-pregna-3',5'-dien-20'-yn-3'-yloxy)-estra-1,3,5(10)-trien-3-ol A suspension of 2 g. 17β-(17'β-acetoxy-19'-nor-17'α-pregna - 3',5'-dien-20'-yn-3'-yloxy)-estra-1,3,5(10)-trien-3-ol acetate (Ex. 36) in 20 ml. tetrahydrofurane and 80 ml. methanol was treated with 10 ml. of a 10% potassium carbonate aqueous solution and kept under stirring at room temperature for about 4 hours.

The reaction mixture was then poured into 300 ml. water, and the precipitate filtered and recrystallized from methylene chloride:methanol to give 1.5 g. of 17β-(17'β-acetoxy - 19'-nor-17'α-pregna-3',5'-dien-20'-yn-3'-yloxy)-estra-1,3,5(10)-trien-3-ol melting at 281–284° C. (with softening at 270° C., $[\alpha]_D=-111°$ C. (dioxan, c.=1%).

According to the above procedure the following disteroidyl ethers are obtained.

TABLE X

| Ex. No. | Disteroidyl ether | Prepared from— |
|---|---|---|
| 156 | 17β-(17'β-enanthoxy-1'α-methyl-5'β-androst-3'-en-3'-yloxy)-estra-1,3,5(10)-trien-3-ol. | End compound Ex. 106. |
| 157 | 17β-(17'β-enanthoxy-5'α-androst-2'-en-3'-yloxy)-estra-1,3,5(10)-trien-3-ol. | End compound Ex. 123. |
| 158 | 17β-(17'β-acetoxy-17'α-vinylestra-3',5'-dien-3'-yloxy)-estra-1,3,5(10)-trien-3-ol. | End compound Ex. 111. |
| 159 | 17β-(17'β-enanthoxy-19'-nor-17'α-pregna-3',5'-dien-20'-yn-3'-yloxy)-estra-1,3,5(10)-trien-3-ol. | End compound Ex. 124. |

EXAMPLE 160

17β-(17'-oxoestra-3',5'-dien-3'-yloxy)-estra-1,3,5(10)-trien-3-ol hemisuccinate

A solution of 1.4 g. of 17β-(17'-oxoestra-3',5'-dien-3'-yloxy)-estra-1,3,5(10)-trien-3-ol (Ex. 139) and 4.2 g. of succinil anhydride in 50 ml. of pyridine was kept overnight at room temperature. The mixture was then poured

19 into 480 ml. of saturated salt solution and extracted with ether. The organic layer was separated, dried on anhydrous sodium sulfate and the solvent removed under reduced pressure. The residue was crystallized from methylene chloride-methanol to give 800 mg. of crystals of 17β-(17'-oxoestra-3',5'-dien-3'-yloxy) - estra - 1,3,5(10)-trien-3-ol hemisuccinate, melting at 170–173° C.

$[\alpha]^D_{25°} = -19.5°$ (c.=0.5, dioxane).

In accordance with the above procedure using instead of succinic anhydride, the anhydride of the acetic, propionic, butyric, valeric, enanthic, caproic, benzoic, malonic, phthalic and glutaric acid and instead of 17β-(17'-oxoestra-3',5'-dien-3'-yloxy) - estra - 1,3,5(10)-trien-3-ol, any other suitable hydroxy free disteroidyl ether obtained by any preceding example the corresponding ester may be prepared. In particular the following disteroidyl derivatives are obtained.

TABLE XI

| Ex. No. | Disteroidyl ether | Prepared from— |
|---|---|---|
| 161 | 17β-(17'β-acetocy-19'-nor-17'α-prenga-3',5'-dien-20'-yn-3'-yloxy)-estra-1,3,5(10)-trien-3-ol hemisuccinate. | End compound Ex. 155. |
| 162 | 17β-(17'β-enanthoxy-19'-nor-17'α-pregna-3',5'-dien-20'-yn-3'-yloxy)-estra-1,3,5(10)-trien-3-ol hemisuccinate. | End compound Ex. 159. |
| 163 | 17β-(17'β-hydroxy-17'α-methylandrosta-3,5'-dien-3'-yloxy)-estra-1,3,5(10)-trien-3-ol 3-hemisuccinate. | End compound Ex. 134. |
| 164 | 17α-(9'α-fluoro-11'β,17'α-dihydroxy-20'-oxo-21-hemisuccinoxy-16'β-methylpregna-1',3',5'-trien-3'-yloxy)-estra-1,3,5(10)-trien-3-ol 3-hemisuccinate. | End compound Ex. 141. |
| 165 | 17β-(11',20'-dioxo-17'α-hydroxy-21'-hemisuccinoxypregna-3',5'-dien-3'-yloxy)-estra-1,3,5(10)-trien-3-ol 3-benzoate. | End compound Ex. 149. |
| 166 | 17β-(11'β,17'α,21'-trihydroxy-20'-oxopregna-3',5'-dien-3'-yloxy)-estra-1,3,5(10)-trien-3-ol 3,21-dihemisuccinate. | End compound Ex. 143. |
| 167 | 17β-(9'α-fluoro-11',20'-dioxo-17'-hydroxy-21'-hemisuccinoxy-16'β-methylpregna-1',3',5'-trien-3'-yloxy)-estra-1,3,5(10)-trien-3-ol 3-hemisuccinate. | End compound Ex. 146. |
| 168 | 17β-(17'β-hydroxy-13'β-ethyl-17'α-ethynylgona-3',5'-dien-3'-yloxy)-estra-1,3,5(10)-trien-3-ol hemisuccinate. | End compound Ex. 133. |
| 169 | 17β-(17'β-hemisuccinoxyestra-3',5'-dien-3'-yloxy)-estra-1,3,5(10)-trien-3-ol hemisuccinate. | End compound Ex. 137. |
| 170 | 17β-(17'β-hydroxy-19'-nor-17'α-pregna-3',5'-dien-20'-yn-3'-yloxy)-estra-1,3,5(10)-trien-3-ol acetate. | End compound Ex. 125. |
| 171 | 17β-(17'β-hydroxy-19'-nor-17'α-pregna-3',5'-dien-20'-yn-3'-yloxy)-estra-1,3,5(10)-trien-3-ol enanthate. | End compound Ex. 125. |

NOTE.—Analogously by reaction with the anhydride of the acetic, propionic, butyric, valeric, enanthic, caproic, benzoic, malonic, phthalic and glutaric acid the corresponding esterified disteroidyl ethers were obtained.

EXAMPLE 172

17β-(17'β-(1''-ethoxyethoxy)-19'-nor-17'α-pregna-3',5'-dien-20'-yn-3'-yloxy)-estra-1,3,5(10)-trien-3-ol acetate A solution of 1 g. 17β-(17'β-hydroxy-19'-nor-17'α-pregna-3',5'-dien-20'-yn - 3' - yloxy)estra-1,3,5(10)-trien-3-ol acetate (Ex. 170) in 10 ml. anhydrous tetrahydrofurane was treated with 10 mg. pyridine tosylate and 2 ml. ethyl vinyl ether and kept at room temperature for 15 hours. The solvent was evaporated and the residue was crystallized from ethanol, to give 750 mg. 17β-(17'β-(1''-ethoxyethoxy)-19'-nor-17'α-pregna-3',5'-dien - 20' - yn-3'-yloxy)-estra-1,3,5(10)-trien - 3 - ol acetate, melting at 126–131° C., $[\alpha]_D = -98°$ C. (dioxan, c.=1%).

According to the above procedure 3-(1'-ethoxyethoxy)-17β-(17''β-(1'''-ethoxyethoxy)-19''-nor - 17''α - pregna-3'',5''-dien-20''-yn-3''-yloxy)estra-1,3,5(10) - triene starting from the end-compound of Ex. 125 and 17β-(17'β-(1''-ethoxyethoxy)-19'-nor-17'α-pregna - 3',5' - dien-20'-yn-3'-yloxy)-estra-1,3,5(10)-trien-3-ol enanthate starting from the end-compound of Ex. 171 were obtained.

20

EXAMPLE 173

17β - (11',20'-dioxo-17'α,21'-dihydroxypregna-3',5'-dien-3'-yloxy)-estra-1,3,5(10)-trien-3-ol benzoate 21'-sulphate sodium salt In a flask provided with a stopper, 9.4 ml. anhydroxy pyridine and 0.42 ml. acetic anhydride were added to 0.721 g. anhydrous sulphate pyridine and the mixture was stirred for 30 minutes. A solution of 1 g. of 17β-(11',20'-dioxo-17'α,21'-dihydroxypregna-3',5'-dien - 3' - yloxy)-estra-1,3,5(10)-trien-3-ol benzoate (Ex. 149) in 10 ml. pyridine was added and the mixture kept under stirring overnight at room temperature. The content of the flask were evaporated under reduced pressure at 40° C. and the residue was taken up with water, adjusted to a pH 11–12 with a 5% aqueous solution of sodium hydrate and extracted with successive portions of n-butanol. Then butanol was removed by a short leating and the residue, taken up with ether, gives 1 g. 17β-(11',20'-dioxo-17'α,21'-dihydroxypregna - 3',5' - dien-3'-yloxy)-estra-1,3,5(10)-trien-3-ol benzoate 21'-sulphate sodium salt.

Analogously to the above procedure starting from the 3-hydroxy free or 17'β-hydroxy free or 21'-hydroxy free disteroidyl ethers of any preceding example, the corresponding 3- or 17'β- or 21'-sulphate alkaline salt was obtained respectively.

EXAMPLE 174

17β-(9'α-fluoro - 11',20' - dioxo-17'α,21'-dihydroxy-16'β-methylpregna - 3',5' - dien-3'-yloxy)-estra-1,3,5(10)-trien-3-ol 3-benzoate 21'-disodium phosphate To a solution of 0.1 ml. of redistilled phosphorus oxychloride in 5 ml. of pyridine is added at −25° C. with stirring a solution of 400 mg. of 17β-(9'α-fluoro-11',20'-dioxo-17'α,21'-dihydroxy-16'β-methylpregna - 3',5' - dien-3'-yloxy)-estra-1,3,5(10)-trien-3-ol 3-benzoate (Ex. 150) in 5 ml. of anhydrous pyridine. To the dichloride thus formed 20 ml. of water is added at the rate that the reaction temperature does not exceed −10° C. The mixture is then allowed to remain at room temperature for 10 minutes and the pyridine is removed in vacuo without applying external heat. The resulting residue is taken up in water, then sodium bicarbonate solution is carefully added until the mixture reaches pH 7. After extraction with chloroform, the aqueous phase is concentrated under vacuum to dryness. The residue is dissolved in methanol and the 17β-(9'α-fluoro - 11',20' - dioxo-17'α,21'-dihydroxy-16'β-methylpregna-3',5'-dien - 3' - yloxy)-estra-1,3,5(10)-trien-3-ol 3-benzoate 21'-disodium phosphate precipitated by addition of 1:1 mixture of anhydrous ether and absolute ethanol.

Analogously to the above procedure starting from the 3-hydroxy free or 17'β-hydroxy free 21'-hydroxy free disteroidyl ethers of any preceding example, the corresponding 3- or 17'β- or 21'-phosphate alkaline salt was obtained respectively.

We claim:
1. Disteroidyl-ethers of formula:

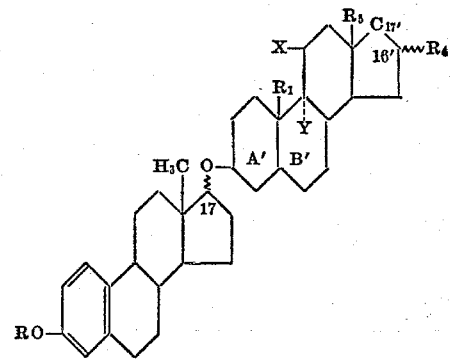

wherein the wavy lines indicate that the oxygen atom linked in 17-position to the estratriene nucleus and the optional substituent in position 16' of the second steroid nucleus may assume the α or β configuration;

R represents hydrogen, an acyl radical containing up to 12 carbon atoms, a hemisuccinyl, hemimalonyl, hemiglutaryl, hemiphthalyl radical, a sulfate or phosphate radical or a hydrocarbon radical selected from the group consisting of an aliphatic radical containing up to 8 carbon atoms, and a cycloaliphatic radical containing 5 or 6 carbon atoms;

$R_1$ represents hydrogen or methyl;

$R_4$ represents hydrogen, halogen, methyl, or an alkanoyloxy radical containing up to 3 carbon atoms;

$R_5$ represents methyl or ethyl;

Y represents hydrogen or fluoro;

X represents hydrogen, β-hydroxy or ketonic oxygen; the carbon atom at the 17' position having one of the following structures:

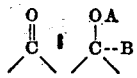

wherein

A represents hydrogen, an acyl radical containing up to 12 carbon atoms, a hemisuccinyl, hemimalonyl, hemiglutaryl, hemiphthalyl radical, or a sulfate or phosphate radical;

B represents hydrogen or a saturated or unsaturated alkyl radical containing up to 3 carbon atoms; and the rings A' and B' having one of the following structures:

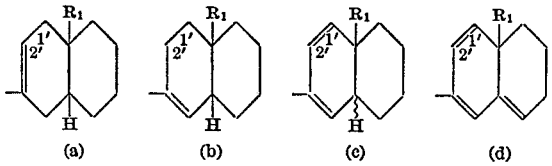

wherein, when either (a), (b) or (c) is present, position 1', or 2' may contain a hydrogen or a methyl group.

2. Disteroidyl-ethers of formula:

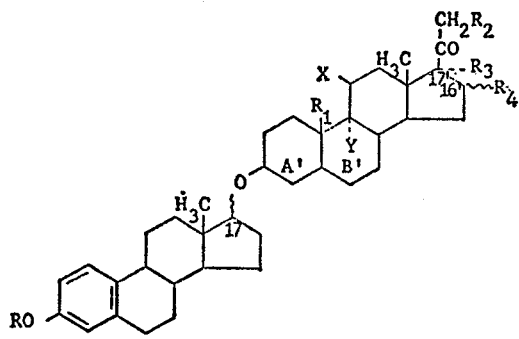

wherein the wavy lines indicate that the oxygen atom linked in 17-position to the estratriene nucleus and the optional substituent in position 16' of the second steroid nucleus may assume the α or β configuration;

R represents hydrogen, an acyl radical containing up to 12 carbon atoms, a hemisuccinyl, hemimalonyl, hemiglutaryl, hemiphthalyl radical, a sulfate or phosphate radical or a hydrocarbon radical selected from the group consisting of a cycloaliphatic radical containing 5 carbon atoms;

$R_1$ represents hydrogen or methyl;

$R_2$ and $R_3$ represent each hydrogen, hydroxy or an acyloxy group containing up to 4 carbon atoms;

$R_2$ represents an OAcyl group in which Acyl is selected from the group consisting of an acyl radical containing up to 12 carbon atoms, a hemisuccinyl, hemimalonyl, hemiglutaryl, hemiphthalyl radical, a sulfate and a phosphate radical, when $R_3$ is hydrogen or hydroxy; $R_3$ represents an acyloxy group containing up to 7 carbon atoms, inclusive, when $R_2$ is hydrogen or hydroxy;

$R_4$ represents hydrogen, methyl, or methylene;

$R_2$ and $R_3$ may form together a cyclopentylidenedioxy radical;

$R_3$ and $R_4$ may form together an isopropylidenedioxy radical or a 1'-methylbenzylidenedioxy radical;

Y represents hydrogen, fluoro or chloro;

X represents hydrogen, β-hydroxy, ketonic oxygen or chloro when also Y represents chloro; and the rings A' and B' having one of the following structures:

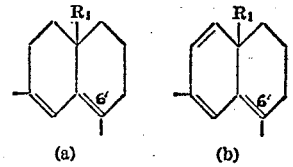

wherein position 6' may be substituted by a halogen atom, or by a methyl group where structure (a) is present.

3. Disteroidyl-ethers of formula:

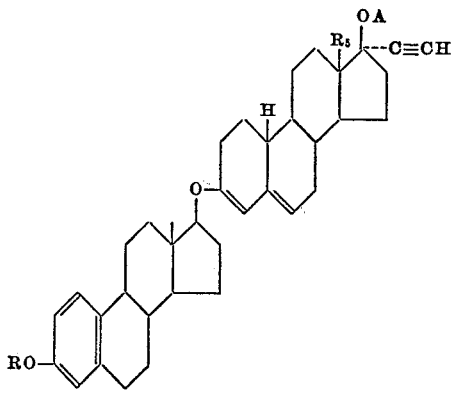

wherein

R represents hydrogen, an acyl radical containing up to 12 carbon atoms, a hemisuccinyl, hemimalonyl, hemiglutaryl, hemiphthalyl radical, a sulfate or phosphate radical or a hydrocarbon radical selected from the group consisting of an aliphatic radical containing up to 2 carbon atoms, and a cycloaliphatic radical containing 5 carbon atoms;

$R_5$ represents methyl or ethyl; and

A represents hydrogen, an acyl containing up to 12 carbon atoms, a hemisuccinyl, hemimalonyl, hemiglutaryl, hemiphthalyl radical or a sulfate or phosphate radical.

4. 17β - (9'α - Fluoro - 11'β,17'α - dihydroxy - 20' - oxo - 21' - acetoxy - 16'α - methylpregna - 1',3',5' - trien-3' - yloxy) - estra - 1,3,5(10 - trien 3 - ol benzoate.

5. 17α - (19' - Nor - 20' - oxopregna - 3',5' - dien - 3'-yloxy) - estra - 1,3,5(10) - trien - 3 - ol benzoate.

6. 17α - (17'α - Acetoxy - 19' - nor - 20' - oxopregna-3',5' - dien - 3' - yloxy) - estra 1,3,5(10) trien - 3 - ol propionate.

7. 17β - (17' - Oxo - 19' - norandrosta - 3',5' - dien - 3'-yloxy) - estra - 1,3,5(10) - trien - 3 - ol benzoate.

8. 17β - (17'β - Hydroxy - 19' - nor - 17'α - pregna-3',5' - dien - 20' - yn - 3' yloxy) estra - 1,3,5(10) - trien-3-ol.

9. 17β - (17'β - Acetoxy - 19' - nor - 17'α - pregna-3',5' - dien - 20' - yn - 3' - yloxy) estra - 1,3,5(10) - trien-3-ol benzoate.

10. 17β - (17'β - Enanthoxy - 19' - nor - 17'α - pregna-3',5' - dien - 20' - yn - 3' - yloxy) - estra - 1,3,5(10)- trien-3-ol benzoate.

11. 17α - (17′β - Acetoxy - 19′ - nor - 17′α - pregna - 3′, 5′ - dien - 20′ - yn - 3′ yloxy) estra 1,3,5(10) - trien - 3-ol benzoate.

12. 17β - (11′β,17′α - Dihydroxy - 20′ - oxo - 21′ - acetoxypregna - 3′,5′ - dien - 3′ - yloxy) estra - 1,3,5(10)-trien-3-ol benzoate.

13. 17β - (17′ - Oxoestra - 3′,5′ - dien - 3′ - yloxy)-estra - 1,3,5(10) - trien - 3 - ol.

14. 17β - (17′ - Oxoestra - 3′,5′ - dien - 3′ - yloxy)-estra - 1,3,5(10) - trien - 3 - ol hemisuccinate.

15. 17α (9′α - Fluoro - 11′β,17′α,21′ - trihydroxy - 20′-oxo - 16′β - methylpregna - 1′,3′,5′ - trien - 3′ -yloxy)-estra - 1,3,5(10) - trien - 3 - ol.

16. 17β - (Cholesta - 3′,5′ - dien - 3′ - yloxy - estra - 1, 3,5(10) - trien - 3 - ol and carboxylic acid esters thereof containing up to 12 carbon atoms.

17. 17β - (11′,20′ - Dioxo - 17α - hydroxy - 21′ - acetoxypregna - 1′,3′,5′ - trien - 3′ - yloxy) - estra - 1,3,5(10)-trien-3-ol benzoate.

18. 17β - (17′β - (1″ - Ethoxyethoxy) - 19′ - nor - 17′α- pregna - 3′,5′ - dien - 20′ - yn - 3′ - yloxy) - estra - 1,3, 5(10) - trien - 3 - ol acetate.

19. 17β - (9′α - Fluoro - 11′β,17′α,21′ - trihydroxy-20′ - oxo - 16′β - methylpregna - 1′,3′,5′ - trien - 3′-yloxy) - estra - 1,3,5(10) - trien - 3 - ol.

20. 17β - (11′β,17′α,21′ - trihydroxy - 20′ - oxopregna-3′,5′ - dien - 3′ - yloxy) - estra - 1,3,5(10) - trien - 3 - ol.

21. 17α - (17′β - Hydroxy - 19′ nor - 17′α - pregna - 3′, 5′ - dien - 20′ - yn - 3′ - yloxy) - estra - 1,3,5(10) - trien-3-ol.

References Cited
UNITED STATES PATENTS 3,631,031 12/1971 Kondo et al. 260—239 SS
3,663,579 5/1972 Stache et al. 260—397.45

ELBERT L. ROBERTS, Primary Examiner

U.S. Cl. X.R.

260—397.4, 397.45, 397.47, 397.5, 239.55; 424—239